US007673297B1

(12) United States Patent
Arsenault et al.

(10) Patent No.: US 7,673,297 B1
(45) Date of Patent: Mar. 2, 2010

(54) AUTOMATIC SOFTWARE UPDATE DETECTION AND FLEXIBLE INSTALLER FOR SET-TOP BOXES

(75) Inventors: Robert G. Arsenault, Redondo Beach, CA (US); Aspandyar M. Jijina, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1186 days.

(21) Appl. No.: 10/934,606

(22) Filed: Sep. 2, 2004

Related U.S. Application Data

(60) Provisional application No. 60/499,674, filed on Sep. 3, 2003.

(51) Int. Cl.
*G06F 9/44* (2006.01)
(52) U.S. Cl. .................. 717/168; 717/169; 717/170; 717/171; 717/172; 717/173
(58) Field of Classification Search .......... 717/168–173
See application file for complete search history.

(56) References Cited

U.S. PATENT DOCUMENTS

| | | | | |
|---|---|---|---|---|
| 5,978,855 | A * | 11/1999 | Metz et al. | 709/249 |
| 6,393,585 | B1 * | 5/2002 | Houha et al. | 714/23 |
| 6,836,793 | B1 * | 12/2004 | Cesar et al. | 709/221 |
| 6,970,960 | B1 * | 11/2005 | Sarfati | 710/106 |
| 7,039,116 | B1 * | 5/2006 | Zhang et al. | 375/240.26 |
| 7,069,578 | B1 * | 6/2006 | Prus et al. | 725/132 |
| 7,150,013 | B2 * | 12/2006 | Kim | 717/168 |
| 2005/0063242 | A1 * | 3/2005 | Ren | 365/222 |
| 2005/0198296 | A1 * | 9/2005 | Teodosiu et al. | 709/225 |

* cited by examiner

*Primary Examiner*—Wei Y Zhen
*Assistant Examiner*—Junchun Wu

(57) ABSTRACT

A method and apparatus for updating set top box software from a resident software version stored in a memory of the set-top box to a current software version is disclosed. The method comprises the step of automatically checking to determine if the resident software version is the current software version, and downloading data comprising at least a portion of the current software version if the resident software version is not the current software version.

42 Claims, 14 Drawing Sheets

AUTOMATIC SOFTWARE UPDATE DETECTION AND FLEXIBLE INSTALLER FOR SET-TOP BOXES

CROSS-REFERENCE TO RELATED APPLICATIONS

This application claims benefit of U.S. Provisional Patent Application No. 60/499,674, entitled "AUTOMATIC SOFTWARE UPDATE DETECTION AND FLEXIBLE INSTALLER FOR SET TOP DECODERS," by Robert G. Arsenault and Aspi Jijina, filed Sep. 3, 2003, which application is hereby incorporated by reference herein.

BACKGROUND OF THE INVENTION

1. Field of the Invention

The present invention relates to systems and methods remotely updating software, and in particular to a system and method for automatically updating software and providing a flexible means for the installation of the downloaded software.

2. Description of the Related Art

Increasingly, the functionality of many products is implemented via processors executing software instructions stored in the product's memory. It is desirable to allow the software in these devices to be remotely updated, thus allowing functional upgrades, bug fixes, and the like.

One product which particularly benefits from the ability to upgrade software are set top boxes (STBs) or integrated receiver decoders (IRDs) used in cable or satellite television reception. The ability to download replacement software or software updates allows the media provider to fix bugs and security holes, provide additional functionality, and to insert a measure of uncertainty in the software functionality to discourage potential pirating of the broadcasted signal. Such devices typically utilize boot strap loaders (BSLs), which include software that are manifested in burn-once programmable read only memories (PROMs) or OTP (one time programmable) flash memories that are not programmable.

Traditional BSLs only receive new software images when the software that is being replaced successfully recognizes and processes 'announcements' that then trigger the BSL processing. For example if the software is functioning properly, after announcements are recognized and processed, the code being replaced sets flags in a non-volatile memory (NVRAM) of the set-top box (for example, the EEPROM of the set-top box). These flags alert the BSL that newer software is to be loaded. However, if the main software was not sufficiently functional, buggy or deficient, announcements cannot be recognized and processed, and new software cannot be downloaded. Furthermore, if the software that is being replaced is hacked, or otherwise compromised, the announcements may, by compromised design, not be processed and thereby preventing the updated software from being installed. What is needed is a system and method for automatically recognizing and processing of such announcements, thus assuring the ability to download updated software when determined necessary.

Another limitation of traditional BSLs is that they can only receive new code images and program the flash memory in the set top box with the updated image. Such traditional BSLs do not permit the downloading of both a software image and an executable code that is used to install the software image. Further, it is possible that the code to be downloaded is too large to be completely downloaded into the flash memory.

What is needed is a system and method that permits both the downloading of the software image and executable code to install that image, and permits the software download to be configured as needed to the STB, as well as being partitioned among memory available in the STB. The present invention satisfies that need.

SUMMARY OF THE INVENTION

To address the requirements described above, the present invention discloses a method and apparatus for updating set top box software from a resident software version stored in a memory of the set-top box (STB) to the most current software version. The method comprises the step of automatically checking to determine if the resident software version is the current software version, and downloading data comprising at least a portion of the current software version if the resident software version is not the current software version. The apparatus comprises a bootstrap loader having an automatically performed instruction set for determining whether the resident software version is the current software version and for downloading data including at least a portion of the current software version if the resident software version is not the current software version, and a memory for storing the current software version.

Unlike traditional BSL systems, the system described herein does not rely on the main software that may not be accurately functional. Instead, the STB automatically checks to determine if the software currently resident in the STB is the appropriate version. If the software version is incorrect, the STB will seek out and load new code. This can be implemented in one of two modes that cannot be changed by the STB's subscriber: (1) an optional mode in which the STB waits a specified period of time for a software update, and if none is available, continues to use a previous version of the software, and (2) a mandatory mode in which the STB waits indefinitely until the current version is resident. The foregoing operations, which auto-check for newer software can be incorporated directly in the BSL algorithm. These features guarantee the ability to download newer software upon demand.

The system described herein also allows a flexible software installation. Traditional BSLs can only receive new code images and program the STB's flash memory with the updated image. The disclosed system supports the downloading of both a software image and an executable code that is used to install the software image. In one embodiment, if the software image does not include the flexible installer, the software image is used to simply program the flash memory as before, but when the software image includes the flexible installer, the software image is installed according to the flexible installer instructions.

The system can uncompress a first portion of the software image and store that uncompressed first portion within random access memory (RAM) within the STB. The system can also uncompress a second portion and store that portion in PROM or flash memory, or other memory within the STB. Thus, the code transmitted to the STB may (1) contain a newer decompression algorithm that could offer tighter transmission images, thus saving bandwidth, (2) contain a specialized flash memory update algorithm that partitions the flash memory in a format that differs from the default programming method, (3) decompress and execute the newly decompressed image that resides solely in RAM without ever reprogramming the flash memory or other memory, and/or (4)

allows new software that could not fit in flash or other non-volatile memory to be loaded and remain in RAM during execution.

These and other advantages of the present invention will become apparent upon reading this disclosure.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Distribution System

Figure 1:
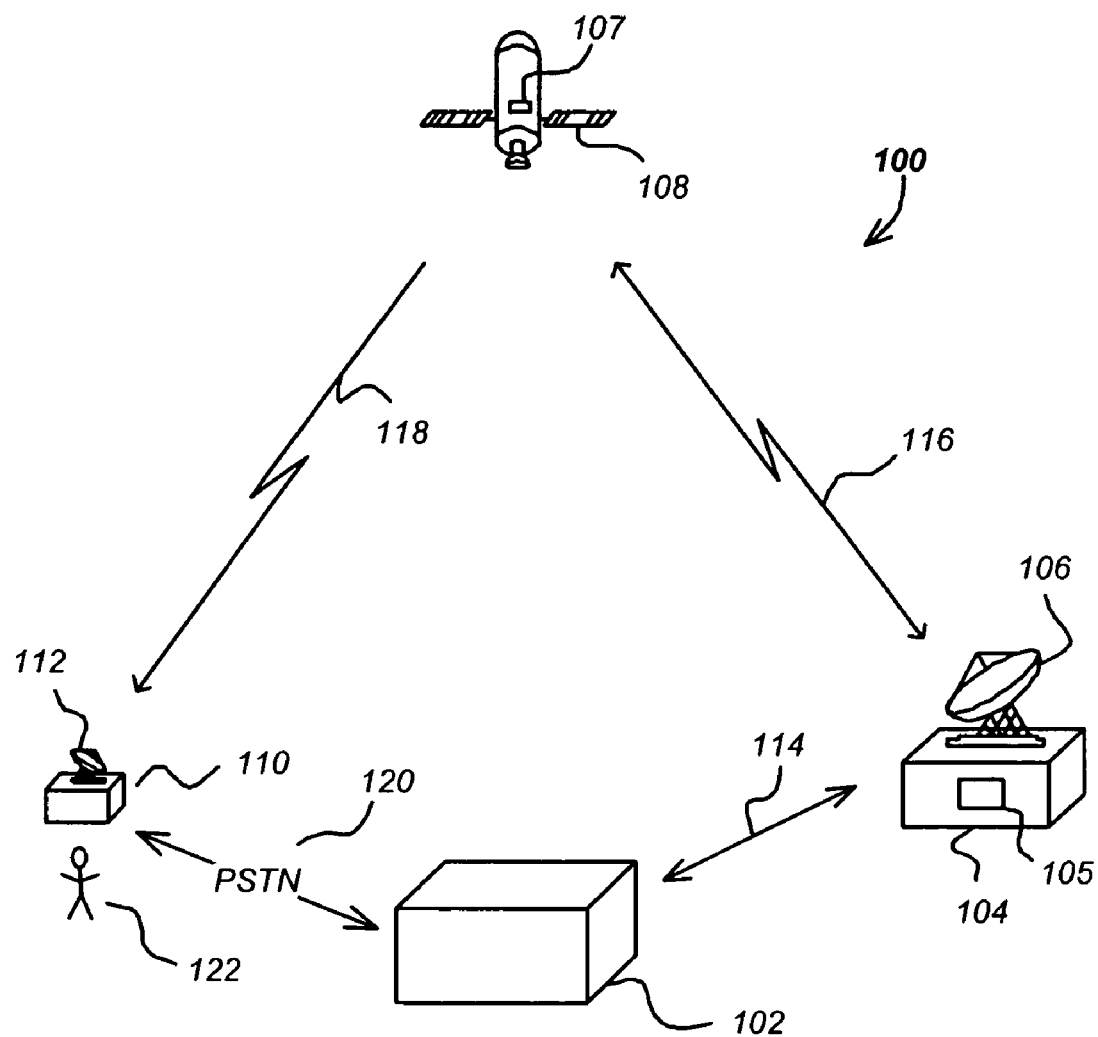
FIG. 1 is a diagram illustrating an overview of a distribution system 100 that an be used to provide video data, software updates, and other data to subscribers.

FIG. 1 is a diagram illustrating an overview of a distribution system 100 that an be used to provide video data, software updates, and other data to subscribers. The distribution system 100 comprises a control center 102 in communication with an uplink center 104 via a ground or other link 114 and with a subscriber receiver station 110 via a public switched telephone network (PSTN) or other link 120. The control center 102 provides program material (e.g. video programs, audio programs, software updates, and other data) to the uplink center 104 and coordinates with the subscriber receiver stations 110 to offer, for example, pay-per-view (PPV) program services, including billing and associated decryption of video programs.

The uplink center receives program material and program control information from the control center 102, and using an uplink antenna 106 and transmitter 105, transmits the program material and program control information to the satellite 108. The satellite receives and processes this information, and transmits the video programs and control information to the subscriber receiver station 110 via downlink 118 using one or transponders 107 or transmitters. The subscriber receiving station 110 receives this information using the outdoor unit (ODU) 112, which includes a subscriber antenna and a low noise block converter (LNB).

In one embodiment, the subscriber receiving station antenna is an 18-inch slightly oval-shaped Ku-band antenna. The slight oval shape is due to the 22.5 degree offset feed of the LNB (low noise block converter) which is used to receive signals reflected from the subscriber antenna. The offset feed positions the LNB out of the way so it does not block any surface area of the antenna minimizing attenuation of the incoming microwave signal.

The distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscriber receiving stations 110. Using data compression and multiplexing techniques the channel capabilities, two satellites 108 working together can receive and broadcast over 150 conventional (non-HDTV) audio and video channels via 32 transponders.

While the invention disclosed herein will be described with reference to a satellite based distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber 122 is video (and audio) program material such as a movie, the foregoing method can be used to deliver program material comprising purely audio information or other data as well. It is also used to deliver current receiver software and announcement schedules for the receiver to rendezvous to the appropriate downlink 118. Link 120 may be used to report the receiver's current software version.

Uplink Configuration

Figure 2:
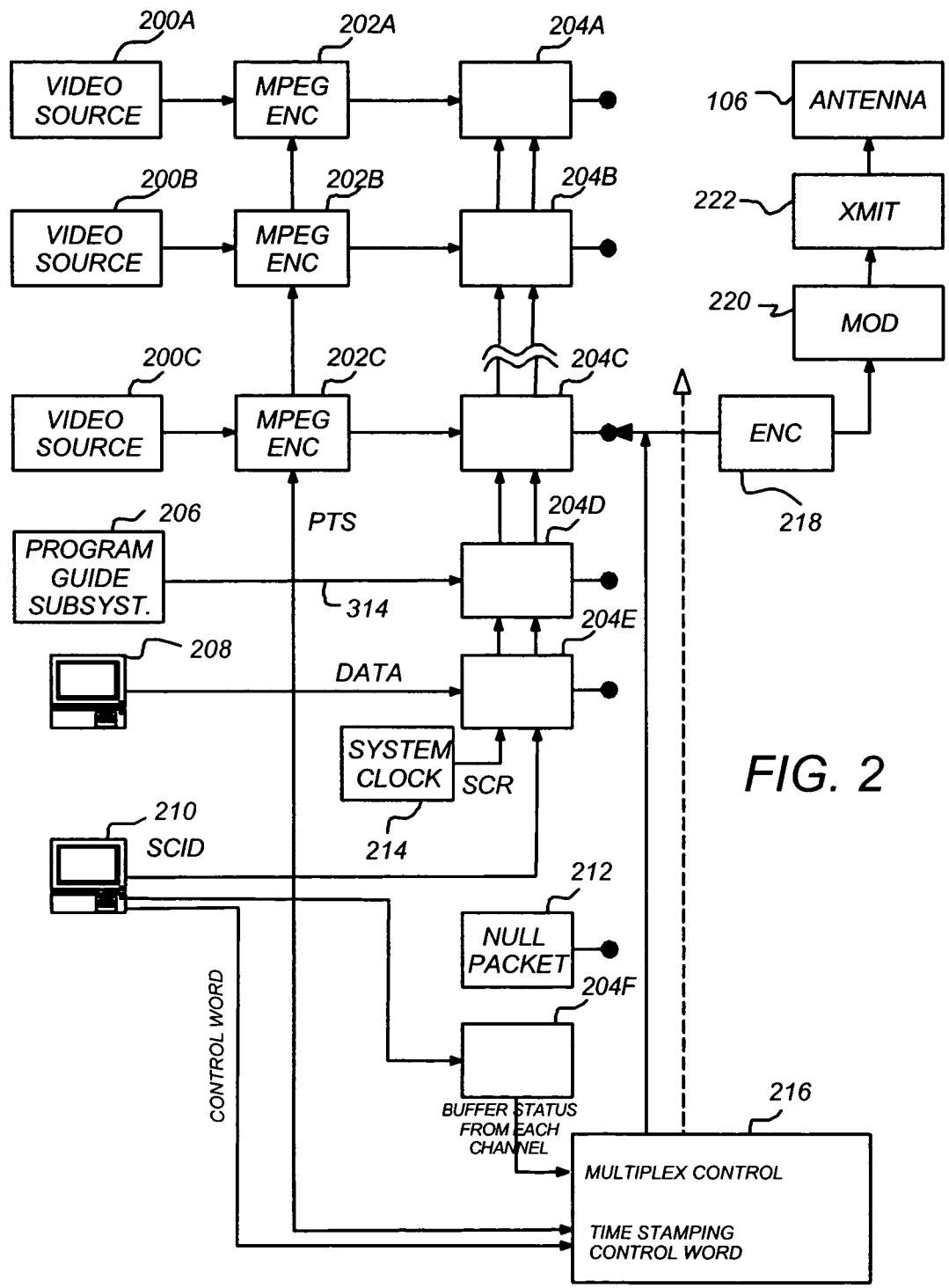
FIG. 2 is a block diagram showing a typical uplink configuration for a single satellite 108 transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), and a data channel from a program guide subsystem 206 and data such as software updates from a data source 208.

The video channels are provided by a program source of video material 200A-200C (collectively referred to hereinafter as video source(s) 200). The data from each video program source 200 is provided to an encoder 202A-202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F (collectively referred to hereinafter as packetizer(s) 204) associated with each source 200.

The data packets are assembled using a reference from the system clock 214 (SCR), and from the conditional access manager 210, which provides the SCID to the packetizers 204 for use in generating the data packets. These data packets are then multiplexed into serial data and transmitted.

Program Guide Subsystem

Figure 3:
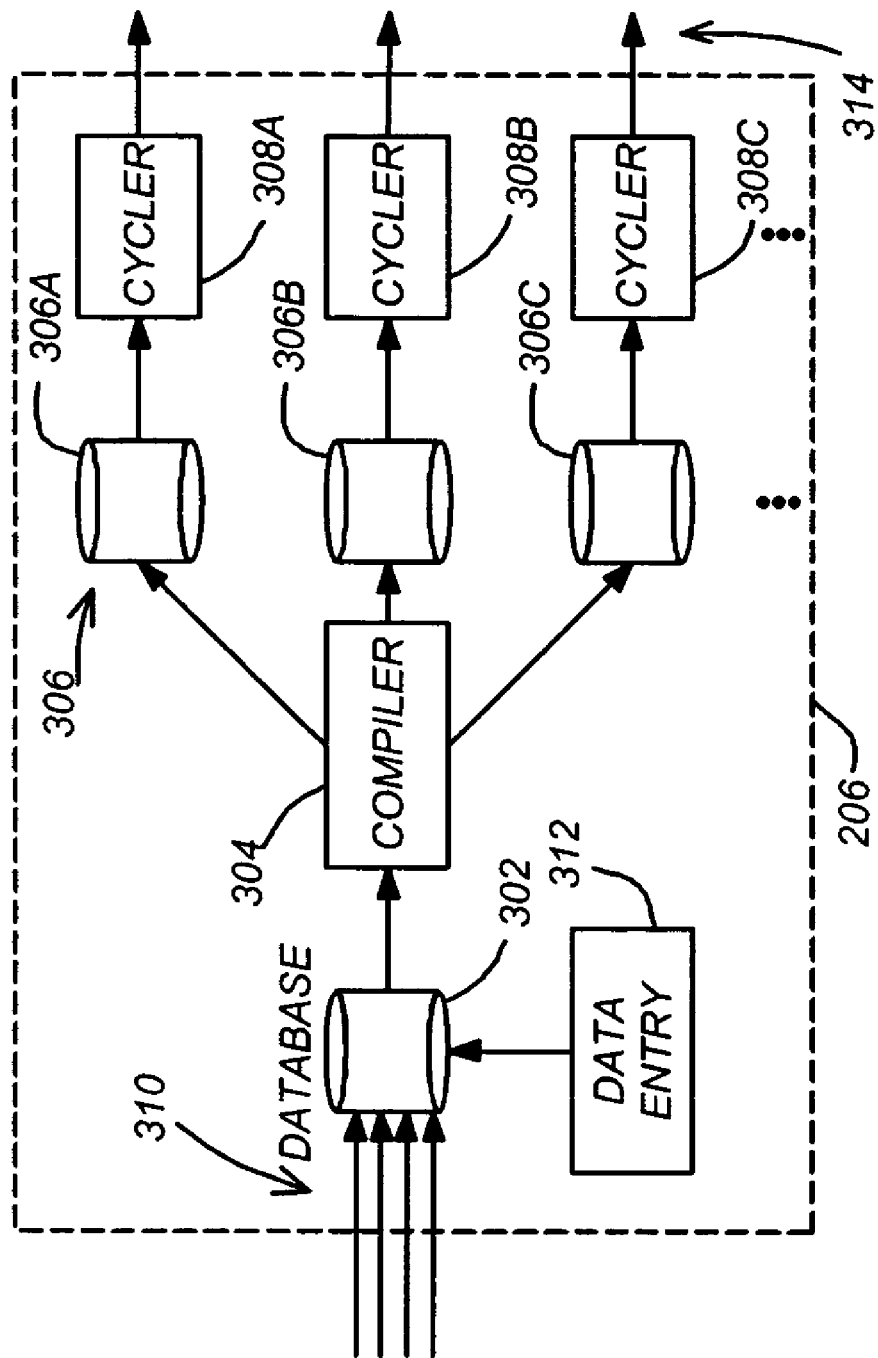
FIG. 3 is a block diagram of one embodiment of the program guide subsystem 206.

FIG. 3 is a block diagram of one embodiment of the program guide subsystem 206. The program guide data transmitting system 206 includes program guide database 302, compiler 304, sub-databases 306A-306C (collectively referred to as sub-databases 306) and cyclers 308A-308C (collectively referred to as cyclers 308).

Schedule feeds 310 provide electronic schedule information about the timing and content of various television channels, such as that found in television schedules contained in newspapers and television guides. Schedule feeds 310 preferably include information from one or more companies that specialize in providing schedule information, such as GNS, TRIBUNE MEDIA SERVICES, and T.V. DATA. The data provided by companies such as GNS, TRIBUNE MEDIA SERVICES and T.V. DATA are typically transmitted over telephone lines or the Internet to program guide database 302.

These companies provide television schedule data for all of the television stations across the nation plus the nationwide channels, such as SHOWTIME, HBO, and the DISNEY CHANNEL. The specific format of the data that are provided by these companies varies from company to company. Program guide database 302 preferably includes schedule data for television channels across the entire nation including all nationwide channels and local channels, regardless of whether the channels are transmitted by the transmission station.

Program guide database 302 is a computer-based system that receives data from schedule feeds 310 and organizes the data into a standard format. Compiler 304 reads the standard form data out of program guide database 302, identifies common schedule portions, converts the program guide data into the proper format for transmission to users (specifically, the program guide data are converted into objects as discussed below) and outputs the program guide data to one or more of sub-databases 308.

Program guide data are also manually entered into program guide database 302 through data entry station 312. Data entry station 312 allows an operator to enter additional scheduling information, as well as combining and organizing data supplied by the scheduling companies. As with the computer organized data, the manually entered data are converted by the compiler into separate objects and sent to one or more of sub-databases 306.

The program guide objects are temporarily stored in sub-databases 306 until cyclers 308 request the information. Each of cyclers 308 preferably transmits objects at a different rate than the other cyclers 308. For example, cycler 308A may transmit objects every second, while cyclers 308B and 308C may transmit objects every 5 seconds and every 10 seconds, respectively.

Since the subscriber's receivers may not always be on and receiving and saving objects, the program guide information is continuously re-transmitted. Program guide objects for programs that will be shown in the next couple of hours are sent more frequently than program guide objects for programs that will be shown later. Thus, the program guide objects for the most current programs are sent to a cycler 308 with a high rate of transmission, while program guide objects for later programs are sent to cyclers 308 with a lower rate of transmission. One or more of the data outputs 314 of cyclers 308 are forwarded to the packetizer of a particular transponder, as depicted in FIG. 2.

It is noted that the uplink configuration depicted in FIG. 2 and the program guide subsystem depicted in FIG. 3 can be implemented by one or more hardware modules, one or more software modules defining instructions performed by a processor, or a combination of both.

Format of Transmitted Program Guide Data

Prior to transmitting program guide data to sub-databases 306, compiler 304 organizes the program guide data from program guide database 302 into objects. Each object preferably includes an object header and an object body. The object header identifies the object type, object ID and version number of the object. The object type identifies the type of the object. The various types of objects are discussed below. The object ID uniquely identifies the particular object from other objects of the same type. The version number of an object uniquely identifies the object from other objects of the same type and object ID. The object body includes data for constructing a portion of a program guide that is ultimately displayed on a user's television.

Prior to transmission, each object is preferably broken down by compiler 304 into multiple frames. Each frame is made up of a plurality of 126 byte packets with each such packet marked with a service channel identification (SOD) number. The SCIDs are later used by receiver or set top box to identify the packets that correspond to each television channel. Each frame includes a frame header, program guide data and a checksum. Each frame header includes the same information as the object header described above—object type, object ID and version number. The frame header uniquely identifies the frame, and its position within a group of frames that make up an object. The program guide data within frames are used by set top box (shown in FIG. 5) to construct and display a program guide and other information on a user's television. The checksum is examined by set top box 500 to verify the accuracy of the data within received frames.

The following is a list of preferred object types, although many additional or different object types may be used: boot object, data announcement object, update list object, channel object, schedule object, program object, time object, deletion object, and a reserved object.

A boot object (BO) identifies the SCIDs where all other objects can be found. A boot object is always transmitted on the same channel, which means that each packet of data that makes up a boot object is marked with the same SCID number. Boot objects are transmitted frequently to ensure that set top boxes 500 which have been shut off, and are then turned back on, immediately receive information indicating the location of the various program guide objects. Thus, boot objects are sent from compiler 304 to a cycler 308 with a high rate of transmission.

A data announcement object (DAO) is an object that includes data that is to be announced to some or all of the set top boxes. The data announcement object can be used in the system described below to indicate that there is updated software to be installed in the set top box.

An update list object (ULO) contains a list of all the channel objects (COs, which are discussed below) in a network. A network is a grouping of all channels from a common source, such as all Digital Satellite System (DSAT) channels. For each channel object in the list of channel objects, the channel list object includes a channel object ID for that channel object. Each channel object is uniquely identified by its channel object ID.

Each channel object provides information about a particular channel. Each channel object points to a schedule object (discussed further below). Each channel object includes multiple fields or descriptors that provide information about that channel. Each descriptor includes a descriptor type ID that indicates the type of the descriptor. Descriptor types include "about" descriptors, "category" descriptors, and "reserved" descriptors. The "about" descriptor provides a description of the channel. When there is no "about" descriptor, the description defaults to a message such as "No Information Available". The "category" descriptor provides a category classification for the channel. More than one "category" descriptor can appear in the channel object if the channel falls into more than one category. "Category" descriptors preferably provide a two-tiered category classification, such as "sports/baseball" or "movie/drama", although any number of tiers may be used including single tiers. "Reserved" descriptors are saved for future improvements to the system.

A program object (PO) provides a complete description of a program. The program object is pointed to by other objects (namely, schedule objects, and HTML objects) that contain the starting time and duration of the program. Like channel objects, descriptors are used within program objects. Program objects use the same types of descriptors as channel objects. Category descriptors provide a category classification for a program and "about" descriptors provide a description of the program. If compiler 52 determines that a particular program is scheduled to appear on multiple channels, the program object for that program is transmitted a single time for the multiple channels, although, as discussed above, it may be retransmitted multiple times.

A schedule object (SO) points to a group of program objects. A schedule object is assigned a time duration by a schedule object (discussed below). Each schedule object identifies all of the program objects that must be acquired for the assigned time duration. Each schedule object is uniquely identified by a schedule object ID. A unique schedule object may be pointed to by more than one schedule object. As time progresses and the scheduling information becomes stale, the schedule object is no longer needed. Schedule objects that are not referenced by any schedule object are discarded by set top box 500.

A schedule object (SO) contains the start time of the entire schedule, as well as the start time and duration of the general program objects. A schedule object points to program objects. The start time of each schedule object is given by its start time. As time progresses and the scheduling information becomes stale, a new schedule object replaces the previous version, and updates the scheduling information. Thus, the channel object of the schedule object need not be updated. Only the schedule object is updated.

A time object (TO) provides the current time of day and date at transmission station 26. Time objects include format codes that indicate which part of the date and time is to be displayed. For example, the only part of the date of interest might be the year. Similarly, whenever dates and times are transmitted within an object, the dates and times are accompanied by format codes. The format codes instruct set top box 500 which portion of the transmitted date and time to display.

A deletion object (DO) provides a list of object IDs that set top box 500 must discard.

Reserved objects are saved for future improvements to the program guide system. When a new type of object is defined, all objects of that new type will include an object header with a reserved object type.

Broadcast Data Stream Format and Protocol

Figure 4A:
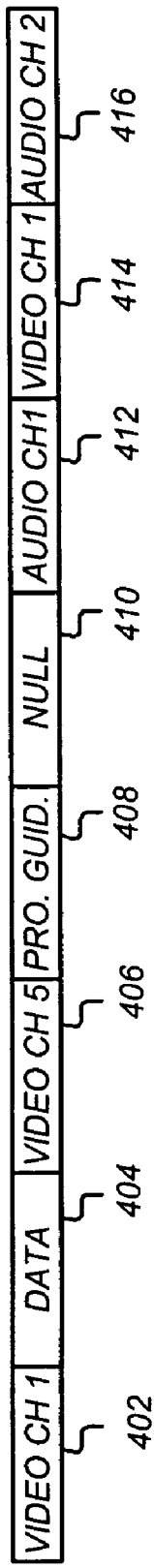
FIG. 4A is a diagram of a representative data stream.

FIG. 4A is a diagram of a representative data stream. The first packet segment 402 comprises information from video channel 1 (data coming from, for example, the first video program source 200A). The next packet segment 404 comprises computer data information that was obtained, for example from the computer data source 208. The next packet segment 406 comprises information from video channel 5 (from one of the video program sources 200). The next packet segment 408 comprises program guide information such as the information provided by the program guide subsystem 206. As shown in FIG. 4A, null packets 410 created by the null packet module 212 may be inserted into the data stream as desired.

The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106. The receiver 200 receives these signals, and using the SCID, reassembles the packets to regenerate the program material for each of the channels.

Figure 4B:
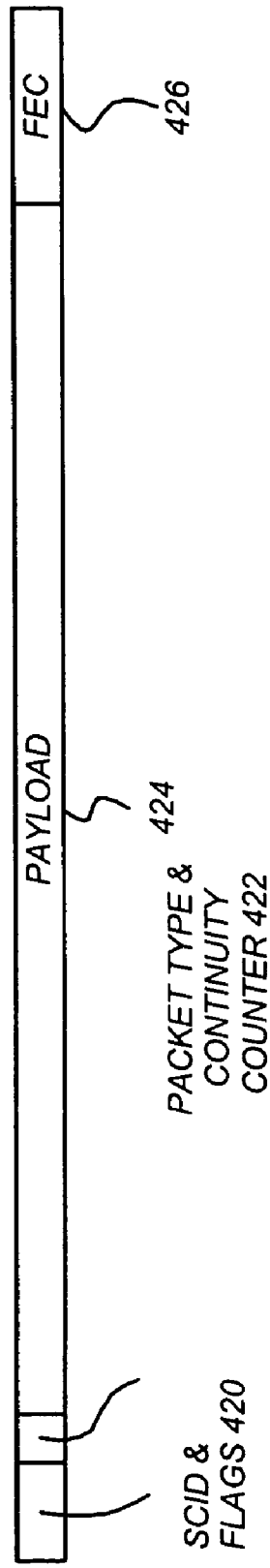
FIG. 4B is a diagram of a data packet.

FIG. 4B is a diagram of a data packet. Each data packet (e.g. 402-416) is 147 bytes long, and comprises a number of packet segments. The first packet segment 420 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 422 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 424 comprises 127 bytes of payload data, which is a portion of the video program provided by the video program source 300 or other audio or data sources. The final packet segment 426 is data required to perform forward error correction.

Set Top Box

Figure 5:
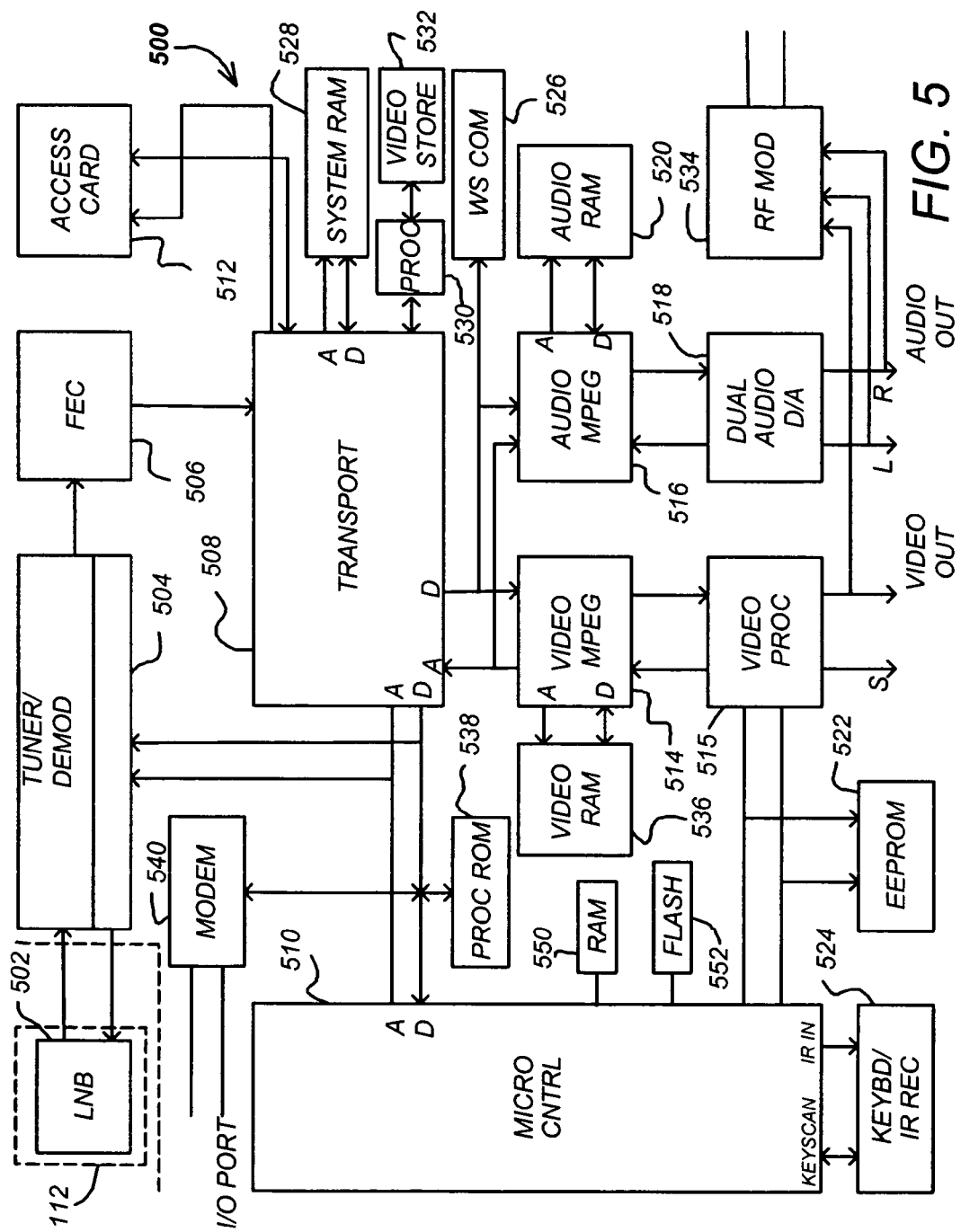
FIG. 5 is a block diagram of an exemplary set top box 500

FIG. 5 is a block diagram of a set top box (STB) 500 (also hereinafter alternatively referred to as receiver or integrated receiver/decoder, or IRD). The set top box 500 comprises a tuner/demodulator 504 communicatively coupled to an ODU 112 having one or more LNBs 502. The LNB 502 converts the 12.2- to 12.7 GHz downlink 118 signal from the satellites 108 to, e.g., a 950-1450 MHz signal required by the set top box's 500 tuner/demodulator 504. The LNB 502 may provide either a dual or a single output. The single-output LNB 502 has only one RF connector, while the dual output LNB 502 has two RF output connectors and can be used to feed a second tuner 504, a second set top box 500 or some other form of distribution system.

The tuner/demodulator 504 isolates a single, digitally modulated 24 MHz transponder, and converts the modulated data to a digital data stream. As packets are received, the tuner/demodulator 504 identifies the type of each packet. If tuner/demodulator 504 identifies a packet as program guide data, tuner/demodulator 504 outputs the packet to memory 78. The digital data stream is then supplied to a forward error correction (FEC) decoder 506. This allows the set top box 500 to reassemble the data transmitted by the uplink center 104 (which applied the forward error correction to the desired signal before transmission to the subscriber receiving station 110) verifying that the correct data signal was received and correcting errors, if any. The error-corrected data may be fed from the FEC decoder module 506 to the transport module 508 via an 8-bit parallel interface.

The transport module 508 performs many of the data processing functions performed by the set top box 500. The transport module 508 processes data received from the FEC decoder module 506 and provides the processed data to the video MPEG decoder 514, the audio MPEG decoder 516, and the microcontroller 150 and/or data storage processor 530 for further data manipulation. In one embodiment of the present invention, the transport module, video MPEG decoder and audio MPEG decoder are all implemented on integrated circuits. This design promotes both space and power efficiency, and increases the security of the functions performed within the transport module 508. The transport module 508 also provides a passage for communications between the microprocessor 510 and the video and audio MPEG decoders 514, 516. As set forth more fully hereinafter, the transport module also works with the conditional access module (CAM) 512 to determine whether the subscriber receiving station 110 is permitted to access certain program material. Data from the transport module can also be supplied to external communication module 526.

The CAM 512 functions in association with other elements to decode an encrypted signal from the transport module 508. The CAM 512 may also be used for tracking and billing these services. In one embodiment of the present invention, the CAM 512 is a smart card, having contacts cooperatively interacting with contacts in the set top box 500 to pass information. In order to implement the processing performed in the CAM 512, the set top box 500, and specifically the transport module 508 provides a clock signal to the CAM 512.

Video data is processed by the MPEG video decoder 514. Using the video random access memory (RAM) 536, the MPEG video decoder 514 decodes the compressed video data and sends it to an encoder or video processor 515, which converts the digital video information received from the video MPEG module 514 into an output signal usable by a display or other output device. By way of example, processor 515 may comprise a National TV Standards Committee (NTSC) or Advanced Television Systems Committee (ATSC) encoder. In one embodiment of the invention both S-Video, baseband video and RF modulated video (NTSC or ATSC) signals are provided. Other outputs may also be utilized, and are advantageous if ATSC high definition programming is processed.

Audio data is likewise decoded by the MPEG audio decoder 516. The decoded audio data may then be sent to a digital to analog (D/A) converter 518. In one embodiment of the present invention, the D/A converter 518 is a dual D/A converter, one for the right and left channels. If desired, additional channels can be added for use in surround sound processing or secondary audio programs (SAPs). In one embodiment of the invention, the dual D/A converter 518 itself separates the left and right channel information, as well as any additional channel information. Other audio formats such as DOLBY DIGITAL AC-3 may similarly be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microprocessor 510 receives and processes command signals from the remote control 524, an set top box 500 keyboard interface, modem 540, and transport 508. The microcontroller receives commands for performing its operations from a processor programming memory, which permanently stores such instructions for performing such commands. The memory used to store data for microprocessor 510 and/or transport 508 operations may comprise a read only memory (ROM) 538, an electrically erasable programmable read only memory (EEPROM) 522, a flash memory 552 and/or a random access memory 550, and/or similar memory devices. The microprocessor 510 also controls the other digital devices of the set top box 500 via address and data lines (denoted "A" and "D" respectively, in FIG. 5).

The modem 540 connects to the customer's phone line via the PSTN port 120. It calls, e.g. the program provider, and transmits the customer's purchase information for billing purposes, and/or other information. The modem 540 is controlled by the microprocessor 510. The modem 540 can output data to other I/O port types including standard parallel and serial computer I/O ports. Data can also be obtained from a cable or digital subscriber line (DSL) modem, or any other suitable source.

The set top box 500 may also comprise a local storage unit such as the storage device 532 for storing video and/or audio and/or other data obtained from the transport module 508. Video storage device 532 can be a hard disk drive, a read/writeable compact disc of DVD, a solid state RAM, or any other storage medium. In one embodiment of the present invention, the video storage device 532 is a hard disk drive with specialized parallel read/write capability so that data may be read from the video storage device 532 and written to the device 532 at the same time. To accomplish this feat, additional buffer memory accessible by the video storage 532 or its controller may be used. Optionally, a video storage processor 530 can be used to manage the storage and retrieval of the video, audio, and/or other data from the storage device 532. The video storage processor 530 may also comprise memory for buffering data passing into and out of the video storage device 532. Alternatively or in combination with the foregoing, a plurality of video storage devices 532 can be used. Also alternatively or in combination with the foregoing, the microprocessor 510 can also perform the operations required to store and or retrieve video and other data in the video storage device 532.

The video processing module 515 output can be directly supplied as a video output to a viewing device such as a video or computer monitor. In addition the video and/or audio outputs can be supplied to an RF modulator 534 to produce an RF output and/or 8 vestigal side band (VSB) suitable as an input signal to a conventional television tuner. This allows the set top box 500 to operate with televisions without a video input.

Each of the satellites 108 comprises one or more transponder, each of which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

Preferably, the set top box 500 also receives and stores a program guide in a memory available to the microprocessor 510. Typically, the program guide is received in one or more data packets in the data stream from the satellite 108. The program guide can be accessed and searched by the execution of suitable operation steps implemented by the microcontroller 510 and stored in the processor ROM 538. The program guide may include data to map viewer channel numbers to satellite networks, satellite transponders and service channel identifications (SCIDs), and also provide TV program listing information to the subscriber 122 identifying program events.

Initially, as data enters the set top box 500, the tuner/demodulator 504 looks for a boot object. Boot objects are always transmitted with the same SCID number, so tuner 504 knows that it must look for packets marked with that identification number. A boot object identifies the identification numbers where all other objects can be found.

As data is received and stored in the memory, the microprocessor 510 acts as a control device and performs various operations on the data in preparation for processing the received data. These operations include packet assembly, object assembly and object processing.

The first operation performed on data objects stored in the memory 550 is packet assembly. During the packet assembly operation, microprocessor 510 examines the stored data and determines the locations of the packet boundaries.

The next step performed by microprocessor 510 is object assembly. During the object assembly step, microprocessor 510 combines packets to create object frames, and then combines the object frames to create objects. Microprocessor 510 examines the checksum transmitted within each object frame, and verifies whether the frame data was accurately received. If the object frame was not accurately received, it is discarded from memory 550. Also during the object assembly step, the microprocessor 510 discards assembled objects that are of an object type that the microprocessor 510 does not recognize. The set top box 500 maintains a list of known object types in memory 550. The microprocessor 510 examines the object header of each received object to determine the object type, and the microprocessor 510 compares the object type of each received object to the list of known object types stored in memory 550. If the object type of an object is not found in the list of known object types, the object is discarded from memory 550. Similarly, the set top box 500 maintains a list of known descriptor types in memory 550, and discards any received descriptors that are of a type not in the list of known descriptor types.

The last step performed by microprocessor 510 on received object data is object processing. During object processing, the objects stored in the memory 550 are combined to create a digital image. Instructions within the objects direct microprocessor 510 to incorporate other objects or create accessible user-links. Some or all of the digital images can be later converted to an analog signal that is sent by the set top box 500 to a television or other display device for display to a user.

The functionality implemented in the set top box 500 depicted in FIG. 5 can be implemented by one or more hardware modules, one or more software modules defining instructions performed by a processor, or a combination of both.

Automatic Software Update Detection and Flexible Installer

FIGS. 6-18 preset block diagrams illustrating exemplary operations that can be used to automatically detect when the software version resident in the set top box should be updated with a current software version. FIGS. 6-9 present top level flow charts generally describing the techniques that can be applied to achieve the foregoing functionality, while FIGS. 10-18 present more detailed embodiment with additional features.

Figure 6:
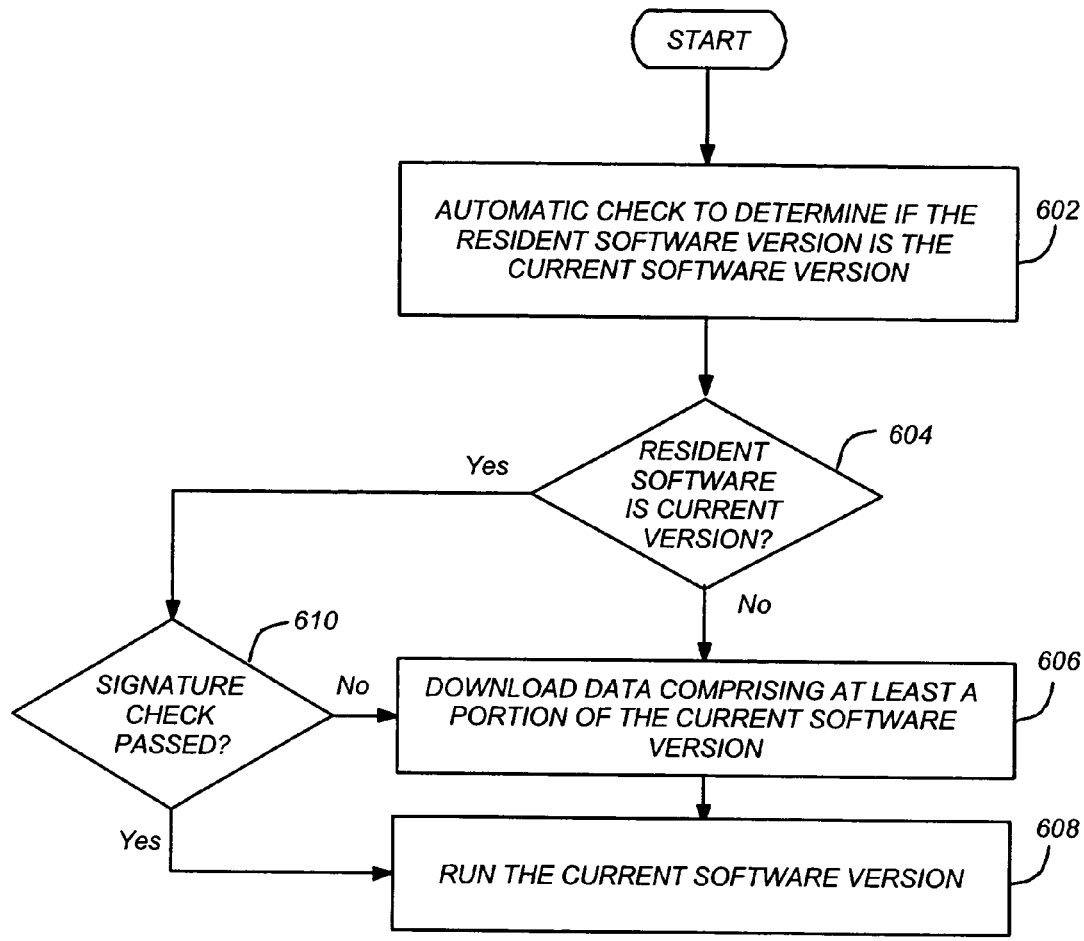
FIG. 6 is a flow chart illustrating exemplary operations that can be used to automatically detect when the software version resident in the set top box should be updated with the current software version.

FIG. 6 is a block diagram illustrating exemplary operations that can be used to automatically detect when the software version resident in the set top box should be updated with the current software version. In block 602, a check to determine if the software resident in the set top box 500 is the current version is automatically performed. Block 604 directs logical flow to block 606 if the software resident in the set top box 500 is not the current version, so that a download of the current software version can be performed, and directs logical flow to block 610 if the resident software is the current version. Block 606 downloads data comprising at least a portion of the current software version, and Block 608 runs the current software version. Block 610 directs logical flow to block 606 if a signature check is not passed, which indicates that the software resident in the set top box 500 is corrupt, so that a download of the current software version can be performed, and directs logical flow to block 608 if a signature check is passed, which indicates that the software resident in the set top box 500 is not corrupt.

Figure 7:
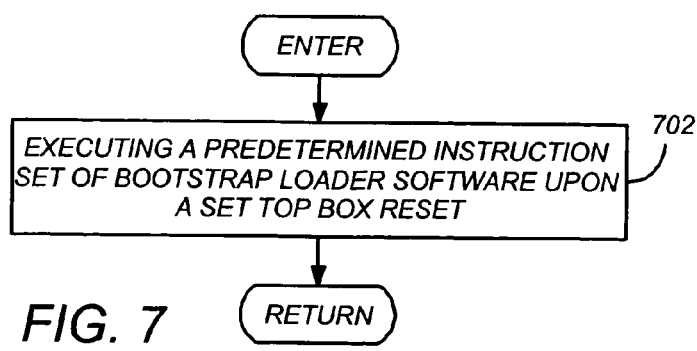
FIG. 7 is a flow chart describing exemplary operations that can be used to automatically check to determine if the resident software version is the current software version.

FIG. 7 presents a flow chart describing exemplary operations that can be used to automatically check to determine if the resident software version is the current software version. As shown in block 702, this is accomplished by executing a predetermined set of bootstrap loader software instructions when the set top box is reset. In one embodiment, the first instruction of the bootstrap loader software instructions is executed. The set top box reset operation can be a hardware reset, a software reset, or a power-up reset that takes place after power to the set top box 500 is interrupted. In another embodiment, the check is a continuous process during normal operation.

Figure 8:
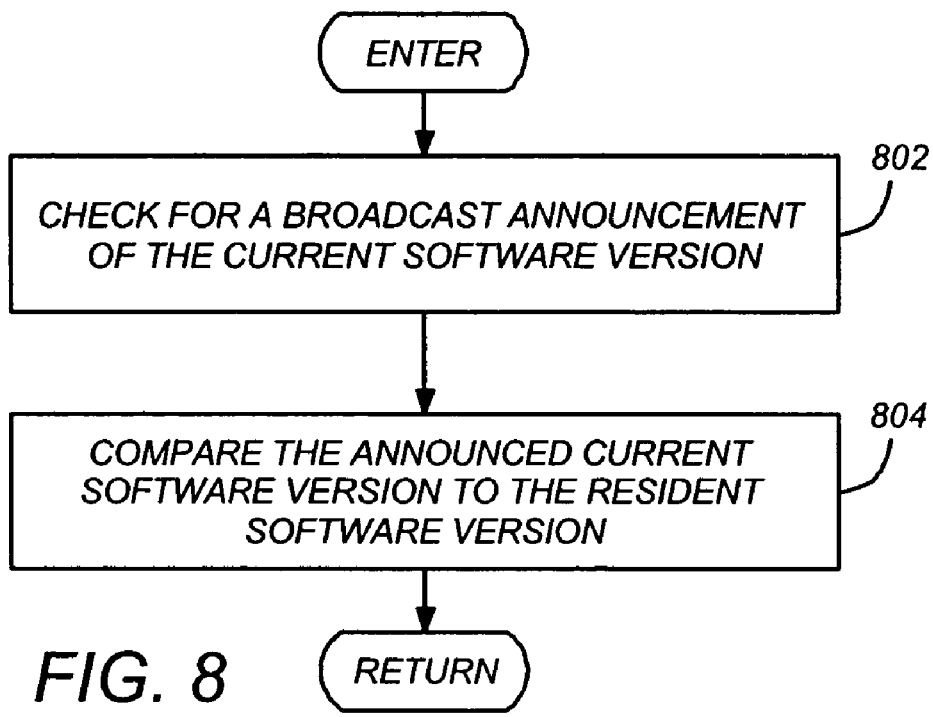
FIG. 8 is a flow chart depicting exemplary operations that can be performed by the executed predetermined instruction set described in FIG. 7.

FIG. 8 is a flow chart depicting exemplary operations that can be performed by the executed predetermined instruction set described in FIG. 7. As shown in block 802, by executing the predetermined instruction set, the boot set top box 500 checks for an announcement of the current software version, wherein the announcement includes data indicating the current software version. In block 804, the announced current software version is compared to the software version resident in the set top box 500. If the announced current software version is the same as the version resident in the set top box, no downloading need occur. If, however, the announced current software version is different than the version resident in the set top box 500 (indicating the version resident in the set top box 500 is outdated), then the set top box 500 downloads data comprising some or all of the current software version.

The downloaded data may include a first sub-portion that comprises at least a portion of the current software version and a second sub-portion comprising executable code for installing the portion of the current software version. In one embodiment, the second sub-portion is stored in the RAM 550 of the set top box 500, while the first portion is stored in flash memory 552, and the microprocessor 510 executes the instructions in the RAM 500 to install the instructions in the first sub-portion. The second sub-portion may also include decompression software, thus allowing newer and more efficient compression/decompression schemes to be used with the download.

In one embodiment, the broadcast announcement includes target selection parameters, an announcement time and duration for the download, and the downlink tuning and decoding parameters, including IP and port protocol parameters. If the receiver matches itself to the target selection parameters, the set top box 500 configures itself to accept the software download (for example, by resetting itself) prior to the download time provided in the broadcast message. For example, if the broadcast announcement time is 2 PM and the specified time period is 15 minutes, the set top box may attempt to download, using the designated downlink tuning and decoding parameters, the data for the next 15 minutes, and if it is unsuccessful, forego the download, and continue to use the software that was resident in the set top box.

Figure 9:
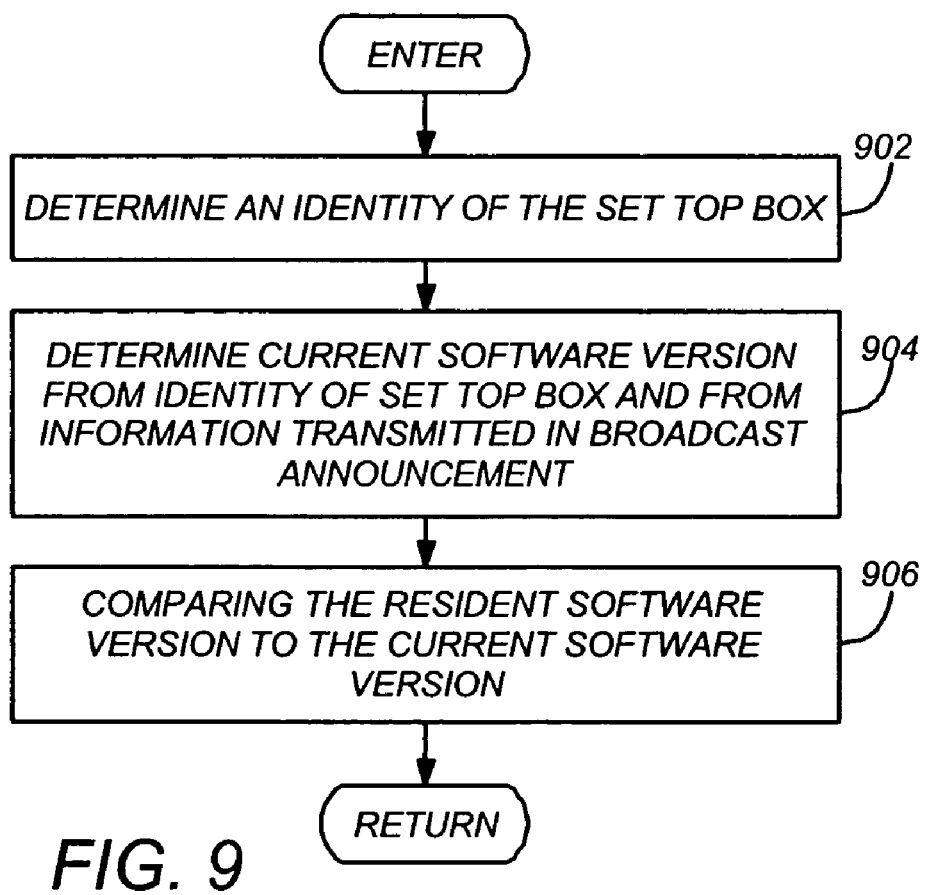
FIG. 9 is a flow chart illustrating exemplary process steps that can be used to compare the announced current software version to the resident software version.

FIG. 9 is a diagram illustrating exemplary process steps that can be used to compare the announced current software version to the resident software version. Block 902 determines the identity or configuration of the set top box 500. This can be determined by reading identity information describing the set top box from a secure memory one time programmable (OTP) flash memory of the set top box 500 accessible to the microprocessor 510. In block 904, the current software version is determined from the identity or configuration of the set-top box. (since different software versions may apply to different generations or versions of set top boxes), and from information transmitted from the control center 102 (i.e. in a broadcast announcement). Block 906 compares the resident software version with the current software version, as determined in block 904.

Figure 10:
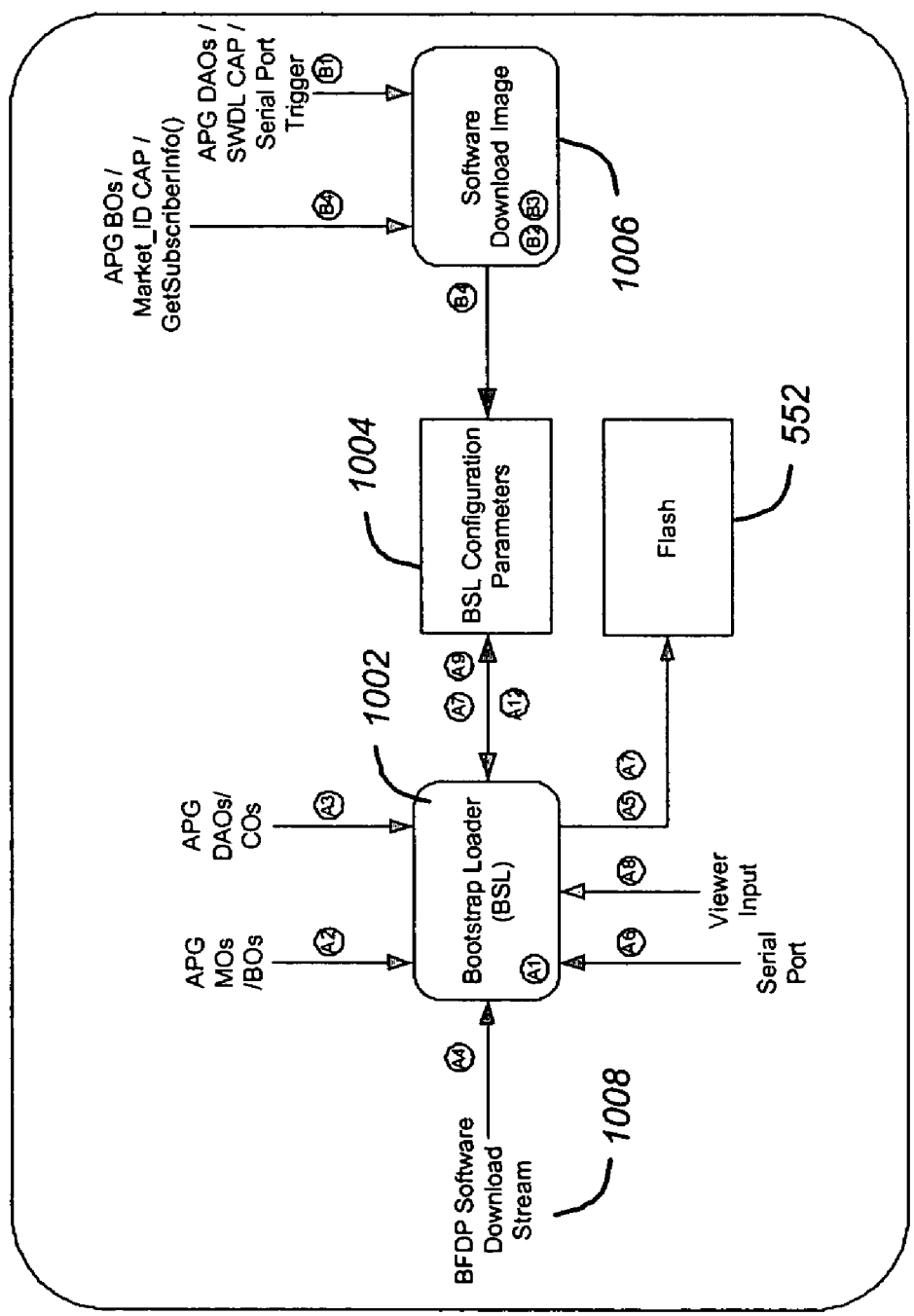
FIG. 10 is a flow chart presenting an overview of processing operations that can be used to perform the operations described above.

FIG. 10 is a diagram presenting an overview of one embodiment system processing operations that can be used to perform the operations described above. The system processing operations shown in FIG. 10 are described in connection with the flow charts presented in FIGS. 11-19.

Figure 11:
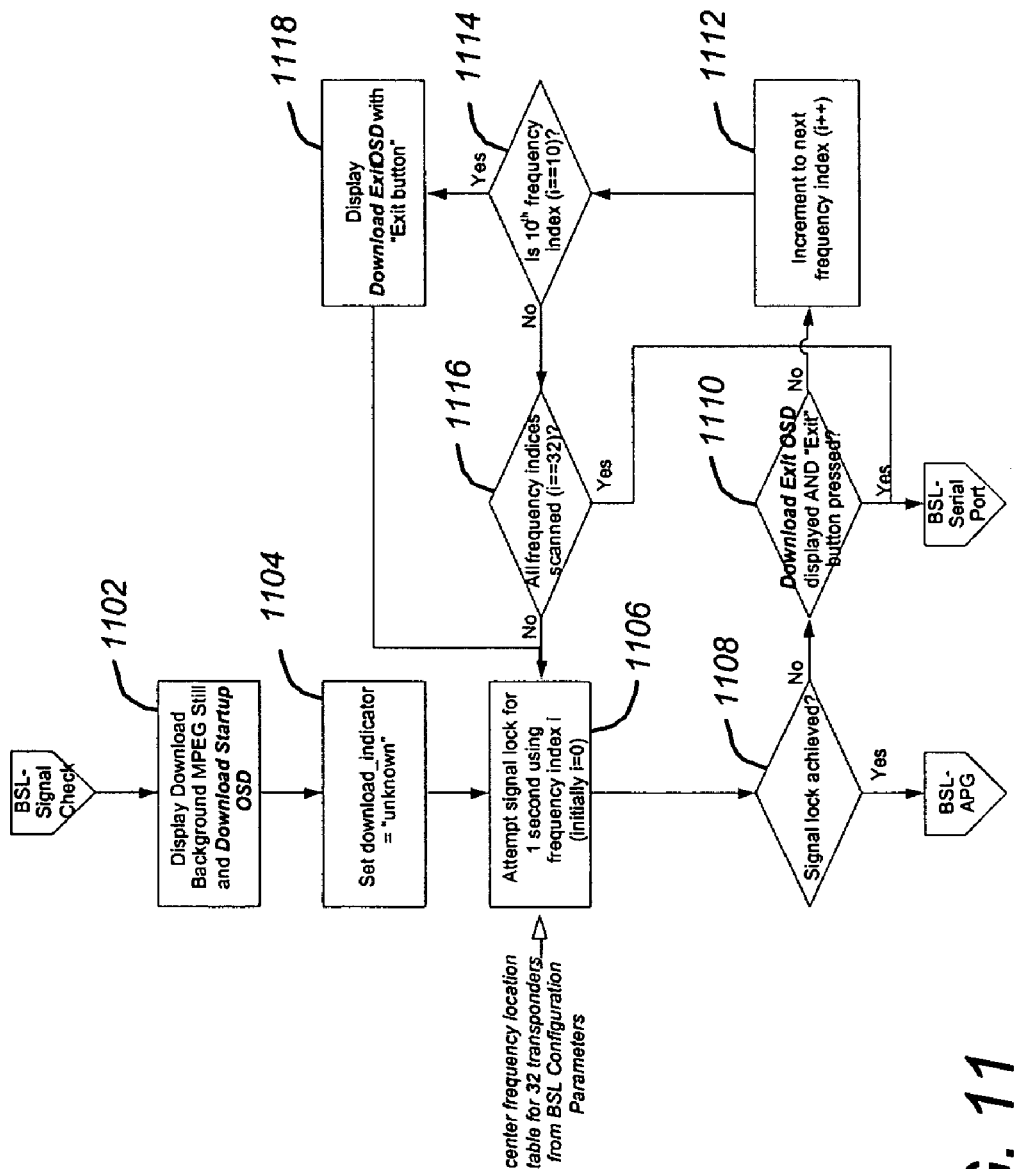
FIG. 11 is a flow chart illustrating bootstrap loader signal check operations.

FIG. 11 is a diagram illustrating bootstrap loader 1002 signal check operations. These operations are denoted by "A1" in FIG. 10. In performing the signal check operations, BSL 1002 execution is initiated when the set top box (STB) 500 is reset. The BSL 1002 first checks the strength of the signals received from the satellite 108 to ensure that the STB 500 has been properly installed and cabled. In block 1102, the BSL 1002 provides an image that the STB 500 provides to the subscriber's television or video monitor for on-screen display (OSD). In one embodiment, this image is an MPEG still image, and provides the message "Download Startup." In block 1004, a "download_indicator" index is set to "unknown." Using information stored in the STB (for example, in a BSL Configuration Parameter table 1004) describing the center frequency location for the satellite transponders 107, the BSL 1002 instructs the STB 500 to attempt signal lock on the first of the transponders 107. If a signal lock is achieved, block 1108 passes processing to a "BSL-APG" routine described in FIG. 12 in which the BSL 1002 attempts to obtain a software download announcement.

If the STB 500 cannot acquire and lock on a signal from that transponder 107, block 1108 passes processing into a "transponder hunt" mode in which it checks the signal level on other transponders 107. Block 1110 interrupts the transponder hunt processing by providing a "Download Exit" OSD and querying whether an "Exit" button is selected. If "Exit" is selected, processing proceeds to a "BSL-Serial Port" routine described in FIG. 15 in which the BSL 1002 attempts to obtain signal lock and software download images through the STB's 500 serial port (e.g. via modem 540). If "Exit" is not selected, the frequency is incremented by block 1112 so that signal lock can be attempted at the next transponder 107. Blocks 1114 and 1118 provide the user with an opportunity to exit the transponder hunt every $10^{th}$ frequency. Otherwise, processing returns to block 1106 to attempt signal lock at the frequency incremented by block 1112. If all frequency indices have been scanned without successfully achieving signal lock, block 1116 exits the BSL Signal Lock routine, and passes processing to the "BSL-Serial Port" routine described in FIG. 15.

Figure 12:
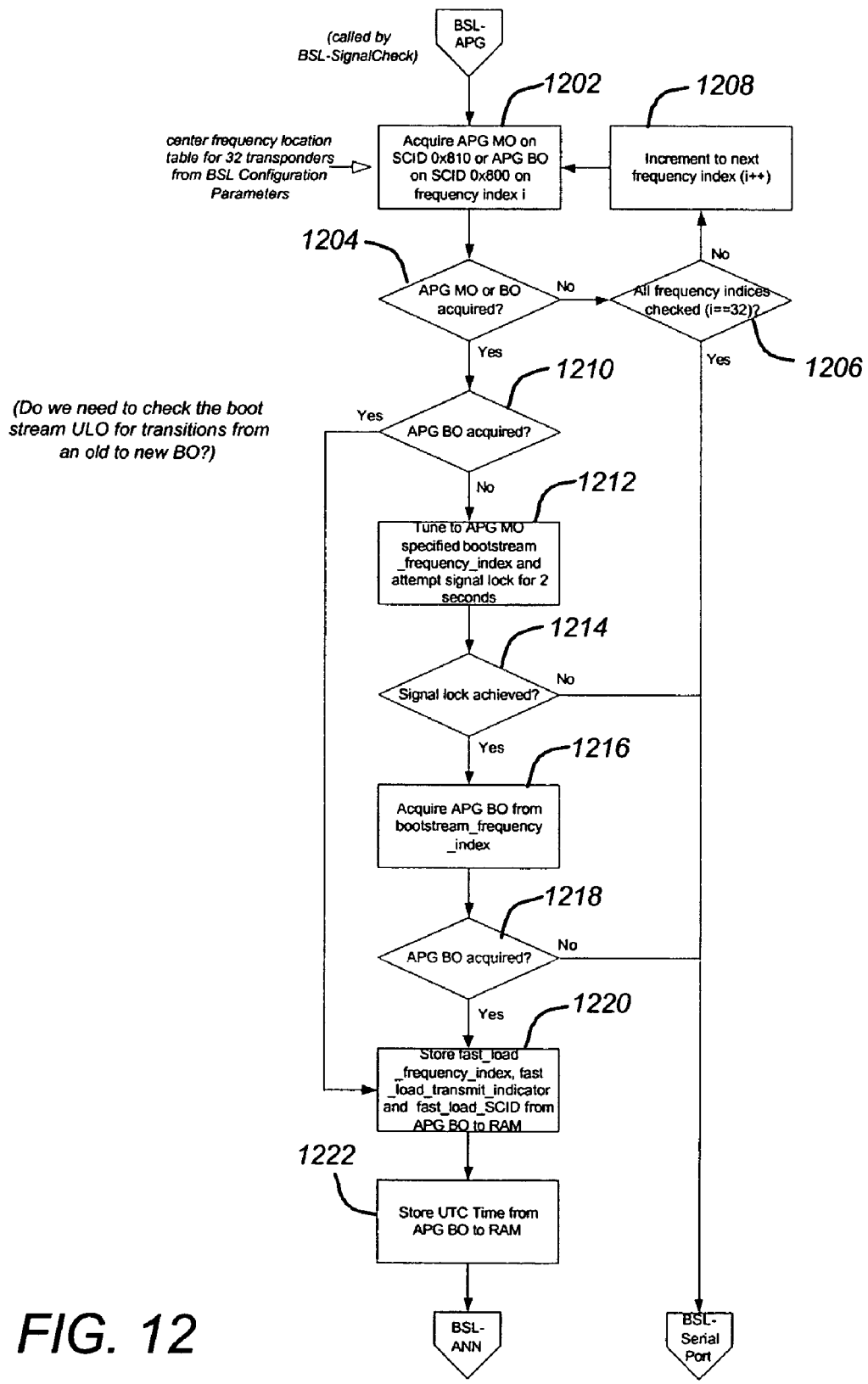
FIG. 12 is a flow chart describing one embodiment of the "BSL-APG" routine in which the boot strap loader (BSL) attempts to acquire a boot object.

FIG. 12 is a diagram describing one embodiment of the "BSL-APG" routine. In this routine, the BSL 1002 attempts to acquire information that will be used to later acquire a data announcement (one embodiment of the "broadcast announcement" described in block 802 of FIG. 8) that has the information required to update the STB 500 software. These operations are denoted by "A2" in FIG. 10.

In the embodiment described below, the "data" described in block 604 of FIG. 6 (which includes at least a portion of the current software, or software update, and may include a routine for decompressing and/or installing the software update) is transmitted to the STB 500 in the form of advanced program guide (APG) data objects. This form of transfer is convenient, as the STB 500 must ordinarily acquire APG objects rapidly to render a newly-installed STB 500 functional. However, the data may be transmitted using other methods as well. For example, the data may be transmitted as a data image with an identifying image header and authenticating signature using a UDP/IP protocol.

In the embodiment illustrated in FIG. 12, the BSL 1002 attempts to acquire an APG Marker Object (MO) and an APG Boot Object (BO). These items are used to determine the location of the software download announcement carousel in the APG broadcast. If the BSL 1002 is unable to acquire the APG MO and BO objects, processing is passed to the "BSL-Serial Port" process described in FIG. 15, and if the BSL 1002 is able to acquire the APG MO and BO objects, processing is passed to the "BSL-ANN" process described in FIG. 13.

Referring now to FIG. 12, using the first of the stored BSL configuration parameters 1004 describing the center frequency location for the relevant transponders 107, block 1202 attempts to acquire the APG MO on a predefined SCID (such as 0x810) or the APG BO on a predefined SCID (such as 0x800). If neither the APG MO or the APG BO are acquired, block 1204 passes processing to blocks 1206 and 1208, which increment the frequency to try the other center frequencies in the BSL configuration parameters 1004. Block 1206 transfers processing to the "BSL-Serial Port" process described in FIG. 15 if an APG BO or and APG MO is not acquired in any of the frequencies defined in the BSL configuration parameters 1004.

If an APG MO or an APG BO are acquired, block 1204 passes processing to block 1220. The APG BO includes transponder frequency index, transmit indicator, an SCID that permits the STB 500 to obtain the software download announcement. The APG BO may also include a time specified in UTC (Universal Coordinate Time). In blocks 1120 and 1122, the information in the APG BO is stored to RAM 550. Processing is then passed to the "BSL-ANN" process described in FIG. 13.

If block 1210 determines that an APG BO has not been acquired, the information on where to find the APG BO is obtained from the APG MO. The APG MO includes a frequency index. Block 1212 directs the STB 500 to tune to the frequency index specified by the APG MO. If signal lock is not achieved, block 1214 passes processing to block 126 so that other frequencies may be attempted. If signal lock is achieved, the APG BO is acquired from the indexed frequency, as shown in block 1216. If the APG BO is not acquired, processing is passed to block 1206. If the APG BO is acquired, processing continues to block 1220, where processing proceeds as described above.

Figure 13:
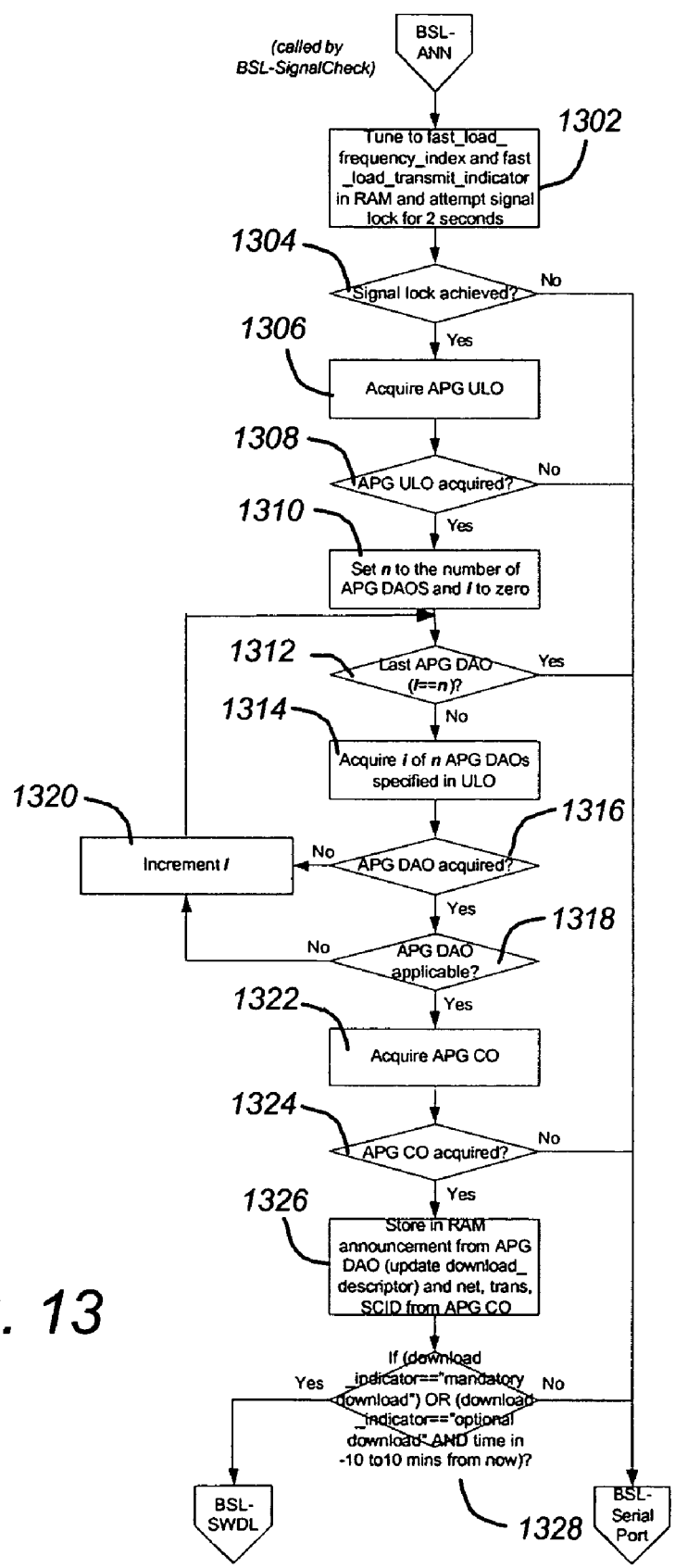
FIG. 13 is a flow chart describing one embodiment of the "BSL-ANN" routine, in which the BSL attempts to acquire an APG data announcement object (DAO) and associated channel object (CO) in order to obtain the software download announcement.

FIG. 13 is a diagram describing one embodiment of the "BSL-ANN" routine, in which the BSL 1002 attempts to acquire an APG data announcement object (DAO) and associated channel object (CO) in order to obtain the software download announcement.

These operations are denoted by an "A3" in FIG. 10. If the BSL 1002 cannot acquire the APG DAOs and the associated APG COs, processing skips to the "BSL-Serial Port" process described in FIG. 15. If the BSL 1002 acquires the APG DAOs and COs, and the software download is optional and within the next 10 minutes, processing s passed to the "BSL-SWDL" operations shown in FIG. 14. Otherwise, processing is passed to the "BSL-Serial Port" process described in FIG. 15.

Turning to FIG. 13, in block 1302, the STB 500 is tuned according to the fast load frequency index and the fast load transmit indicator stored in RAM 550 (as performed by block 1220), and attempts to acquire the signal. If signal lock is not achieved, block 1304 passes processing to the "BSL-Serial Port" process described in FIG. 15. If signal lock is achieved, the BSL 1002 attempts to acquire a APG ULO, which lists all DAOs to be acquired, as shown in block 1306. The APG ULO specifies which of the APG DAOs should be acquired. If acquisition of the APG ULO fails, block 1308 passes processing to the "BSL-Serial Port" process described in FIG. 15. If the acquisition of the APG ULO succeeds, block 1308 passes processing to block 1310, where an index "i" is initialized to zero, and an index "n" is set to the number of APG DAOs as specified in the APG ULO. Block 1312 checks to see if the last acquired (or attempted acquired) APG DAO is the last one, and if so, processing is passed to the "BSL-Serial Port" process described in FIG. 15. Block 1314 attempts to acquire the $i^{th}$ APG DAO. If that APG DAO is acquired, it is used to acquire the associated APG CO. The APG DAO, which includes the update download descriptor, which is the DAO announcement metadata, update download descriptor, which specifies the scheduled time and priority (e.g. mandatory or optional) of the download, and associated APG CO (which includes data describing the a network, transponder, and SCID that will be used to acquire the software download itself is stored in RAM 550 for later use. If a download indicator indicates that the download is mandatory, or if the download indicator indicates that the download is optional and is scheduled within a time period from the current time (e.g. 10 minutes), block 1328 passes processing to the "BSL-SWDL" process described in FIG. 14, which downloads the software. If neither of the foregoing conditions are true, block 1328 passes processing to the "BSL-Serial Port" process described in FIG. 15.

Blocks 1316 test to see whether a particular one of the "n" APG DAOs was acquired in block 1314. If not, block 1320 increments the index "i" and returns processing is passed to block 1312. Block 1318 checks to see if the APG DAO acquired in block 1314 is applicable by comparing the announcement's target selection parameters to the receiver's identification (e.g., manufacturer, model, user, zip code, user group, etc.). If so, the associated APG CO is acquired in block 1322. If not, the index "i" is incremented and processing returns to block 1312.

The APG DAO and APG CO are then processed by the STB 500. The STB schedules the download for the time and priority set by the APG DAO and to tune to the STB tuner to receive the download as specified in the APG CO at the appropriate time. This is illustrated in "B2" in FIG. 10. As illustrated in step "B3", the STB 500 is reset at the specified time, allowing the BSL 1002 to be executed. Upon reset, as illustrated in step B4, the STB 500 updates the BSL configuration parameters 1004 based on the APG BO. These updated configuration parameters 1004 may contain (1) an update for the frequency location table used in connection with the operations shown in FIGS. 11 and 12, perhaps through a "satellite_descriptor" variable in the APG BO, (2) a Market_ID conditional access packet (CAP) which includes a market identifier, the state, and the zip code of the STB 500, and/or a DSK (DIRECTV Security Kernel) application program interface call such as a "Get SubscriberInfo( )" call for a conditional access module (CAM) or access card 512 identifier and a subscriber identifier. These configuration parameters 1004 can be used to determine the identity of the STB 500 as required, for example, as illustrated in block 902 of FIG. 9

Figure 14:
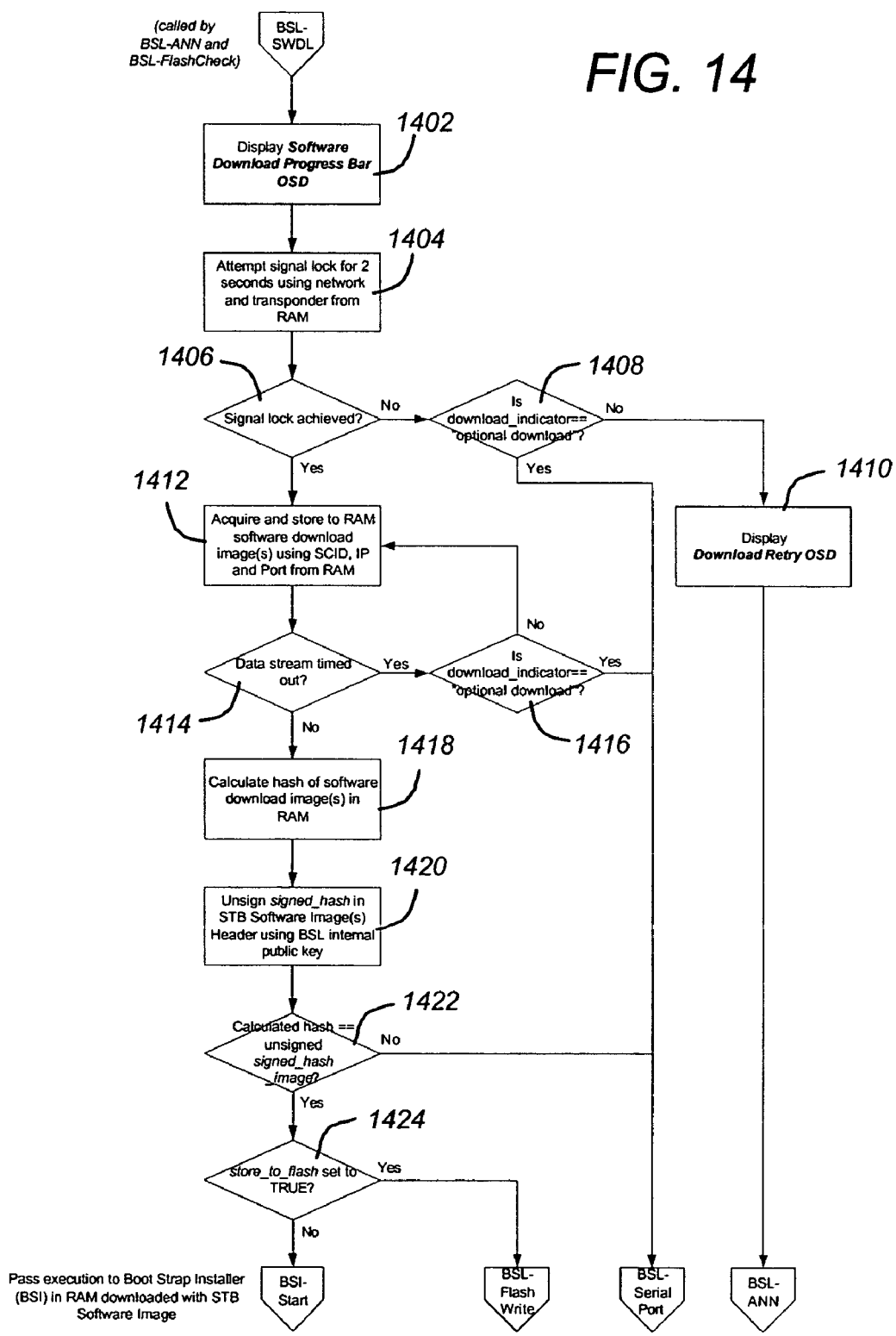
FIG. 14 presents a flow chart illustrating exemplary processing that can be used by the BSL to attempt to tune the STB to receive the Broadcast File Download Protocol (BFDP) download stream.

FIG. 14 presents a flow chart illustrating exemplary processing that can be used by the BSL 1002 to attempt to tune the STB 500 to receive the Broadcast File Download Protocol (BFDP) download stream 1008 specified in the APG CO. The stream 1008 contains many images, each distinguished by unique file identifiers. Block 1403 displays a "Software Download" message on the OSD. The message may include a progress bar that is updated as the data is downloaded into the STB 500. Using the network, transponder, and SCID stored in RAM 550 from the previously acquired APG CO, the BSL 1002 attempts to lock onto a signal, as shown in block 1404. If block 1406 determines that a signal lock is not achieved and a mandatory download was specified, block 1408 passes processing to block 1410, which presents a "Download Retry" message on the OSD. Thereafter, the BSL 1002 returns processing to the "BSL-ANN" process illustrated in FIG. 13 above. If a signal lock is not achieved and an optional download was specified, BSL 1002 processing is passed to the "BSL-Serial Port" process described in FIG. 15.

If a signal lock is achieved, block 1412 uses the SCID, IP and Port identified in RAM 550, which come from the tuner and decoder parameter in the announcement. to acquire and store the downloaded images 1006 as specified in RAM 550. In one embodiment, this data is stored to RAM 550, but it may be stored directly to flash 552, if desired.

Block 1414 checks to determine whether the download of the datastream 1008 timed out. If the download timed out and the download is not optional, blocks 1414 and 1416 return processing to block 1412. If the download is optional, processing is passed to the "BSL-Serial Port" process described in FIG. 15. If the download of the datastream 1008 does not time out, but rather, is completely downloaded processing continues to block 1418. Blocks 1418 and 1422 authenticate the downloaded software images. In one embodiment, this is accomplished by computing a hash of the software download images stored in RAM 550, as shown in block 1418, and comparing the calculated hash with an unsigned version of a signed hash that is included in the header of the downloaded software. This is shown in blocks 1418-1422. The unsigning operation depicted in block 1420 is accomplished by a private key stored in or accessible to the BSL 1002. Authentication can also occur via encryption processes or by similar techniques.

As described above, one of the features of the described system is that it allows the downloaded software to be simply loaded into flash memory, or to be installed according to installer instructions that are transmitted with the software download. In the embodiment illustrated in FIG. 14, this is controlled using a "store_to_flash" flag. If the "store_to_flash" flag is set, the downloaded images are simply stored in flash memory 552. If the "store_to_flash" flag is not set, the images are installed by a boot strap installer (BSI) that is downloaded into RAM 550 as a part of the software download. This is illustrated in block 1424, which directs processing according to the "store_to_flash" flag included with the downloaded data. If the "store_to_flash" is set to a true state, processing is directed to a "BSL Flash Write" process described in FIG. 17. If not, processing is directed to a "BSI-Start" process in which execution is passed to a bootstrap installer (BSI), which was downloaded into RAM with the software image and stored in the RAM 550. The installer is a full application that can update the flash memory per custom methods for that current software version. This includes manipulating NVRAM to be compatible with the format expected by the latest software being installed.

Figure 15:
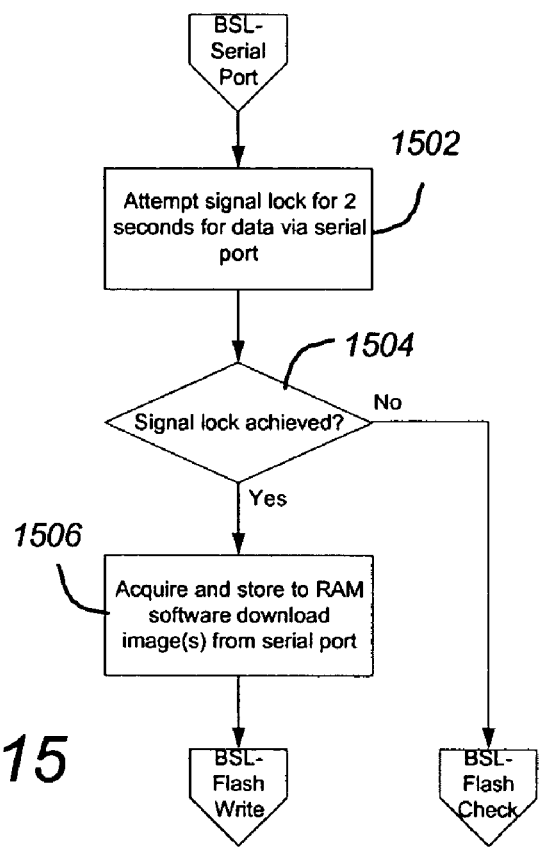
FIG. 15 is a flow chart illustrating exemplary operations that are performed when ordinary attempts to obtain the BFDB software download are unsuccessful.

FIG. 15 is a flow chart illustrating exemplary operations that are performed when ordinary attempts to obtain the BFDB software download are unsuccessful, and the BSL 1002 instead attempts to obtain the BFDB software download via a serial port on the STB 500. Block 1506 attempts to obtain data via the serial port. If signal lock on the data is achieved, the required software images are downloaded (e.g. by a software download conditional access packet) via the serial port and stored into RAM550. These images can be in the APG object form described above, or may simply be a serial data stream. Processing is then passed to the "BSL-Flash Write" routine described in FIG. 17, which writes the downloaded software to the appropriate memory. The software download image has a header which includes a "store_to_nvram" flag. If this flag is set true, then the software download image is stored to flash memory 552. If not, the boot stream installer (BSI) is initiated, and the download image is installed as directed by the installer. If signal lock is not achieved, block 1504 passes processing to the "BSL-Flash Check" routine disclosed in FIG. 18 is performed. This routine performs an integrity check of the software image stored in flash memory 552.

Figure 16:
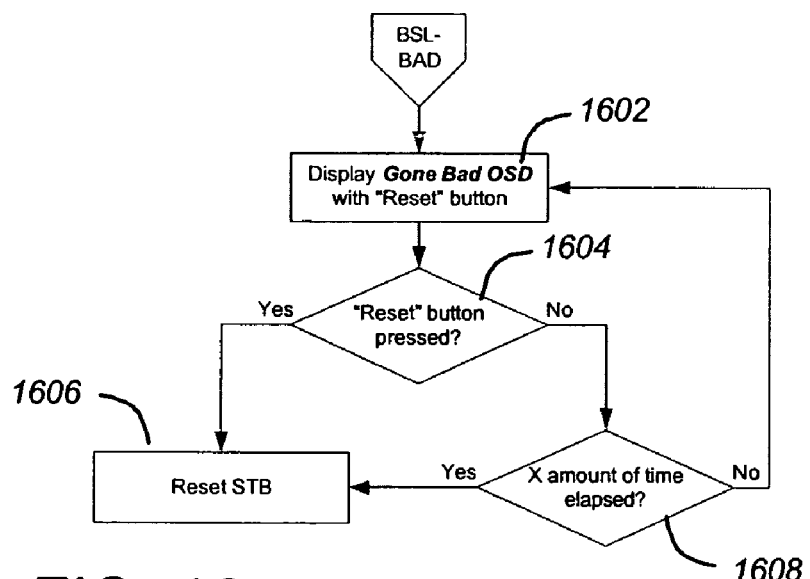
FIG. 16 is a diagram illustrating exemplary operations that can be performed when the download and update functions are not successfully completed and are unresolved by other routines.

FIG. 16 is a diagram illustrating exemplary operations that can be performed when the download and update functions are not successfully completed and are unresolved by other routines. Block 1602 displays a "Gone Bad" OSD message and presents a reset button or other means by which the STB 500 may be reset. If the reset button is pressed, processing is passed to block 1606, and the STB 500 is reset. Note that this begins execution of the BSL 1002 anew. If the reset button is not pressed, block 1608 resets the STB 500 after a lapse of a time period. Until lapse of the time period, block 1608 loops processing back to block 1602.

Figure 17:
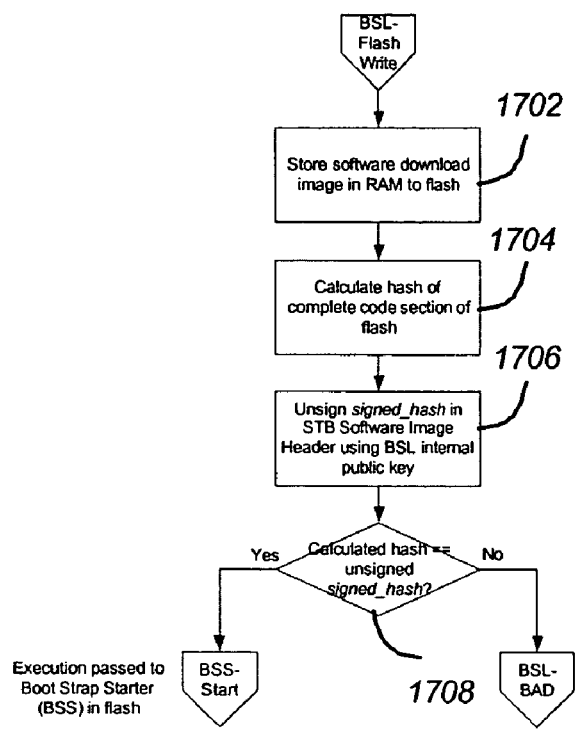
FIG. 17 is a flow chart illustrating exemplary operations that can be performed to store the downloaded software from RAM to flash memory and to restart the STB with the newly downloaded software.
Figure 18:
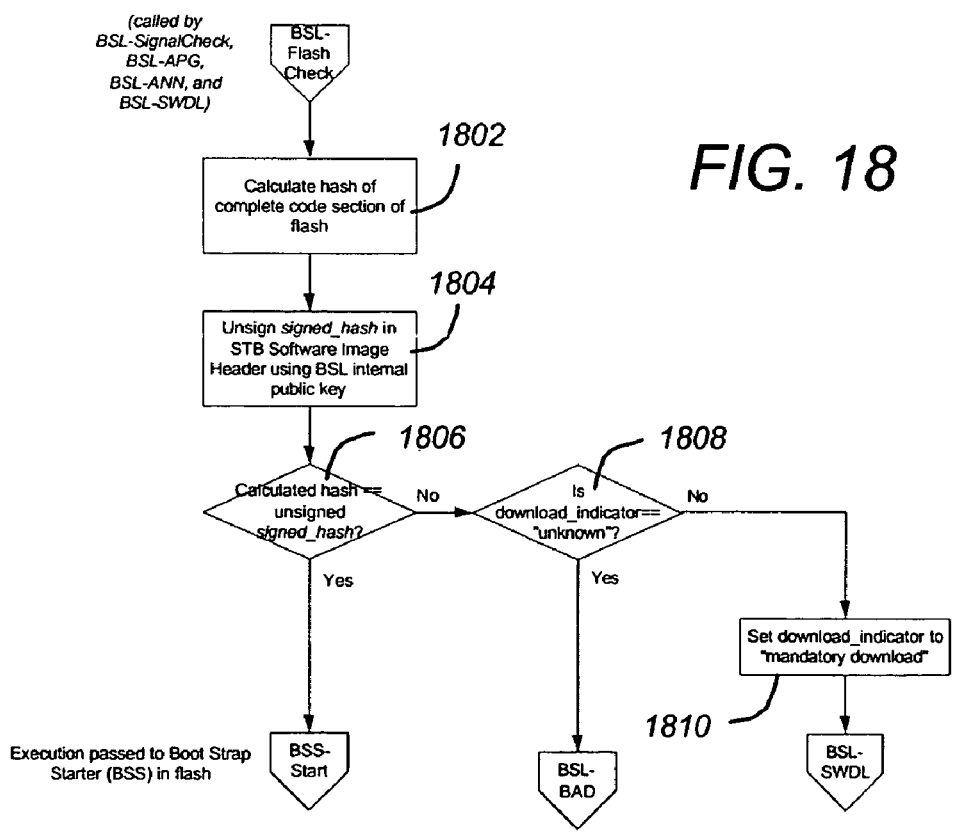
FIG. 18 is a flow chart illustrating exemplary operations that can be performed to check the data loaded in the flash memory.

FIG. 17 is a flow chart illustrating exemplary operations that can be performed to store the downloaded software from RAM 550 to flash memory 552 and to restart the STB with the newly downloaded software. In block 1702, the downloaded software images 1006 are read from RAM 550 and stored in flash memory 552. In block 1704 a hash the completed code section of the flash memory 552 is calculated. In block 1706, the signed hash in the header of the STB software image 1006 is unsigned, using the BSL public key described above. Block 1708 compares the hash with the unsigned "signed hash". If the two are equal, execution is passed to a boot strap starter (BSS) routine stored in the flash memory 552. If the calculated hash and the unsigned hash are not equal, block 1708 passes execution to the "BSL-BAD" routine described in FIG. 16.

FIG. 18 is a flow chart illustrating exemplary operations that can be performed to check the data loaded in the flash memory 552. Block 1802 calculates a hash of the complete code section of the flash memory 552. Block 1804 unsigns the "signed hash" in the header of the software image 1006, using the BSL public key described above. If the calculated and the unsigned "signed hash" favorably compare, execution is passed to the boot strap starter (BSS) routine stored in the flash memory 552. If they do not favorably compare, processing is passed to block 1808. If the status of the download indicator (which indicates whether the download is mandatory or optional) is unknown, processing is passed to the "BSL-BAD" routine described in FIG. 16. If not, processing is passed to block 1810 which sets the download indicator to a mandatory download, and processing is passed to the "BSL SWDL" routine described in FIG. 14.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of updating set top box software from a resident software version stored in a memory of a set-top box to a current software version, wherein the set-top box comprises a tuner and a modem, the method comprising the steps of:
    automatically checking to determine if the resident software version is the current software version; and
    downloading data comprising at least a portion of the current software version if the resident software version is not the current software version;
    wherein the step of automatically checking to determine if the resident software version is the current software version comprises the step of executing a predetermined instruction set of bootstrap loader software upon a set top box reset; and
    wherein the step of downloading data comprises the steps of:
        determining if the tuner receives a first signal; and
        if the tuner does not receive the first signal, automatically downloading the data comprising at least a portion of the current software version via the modem.

2. The method of claim 1, wherein the set top box reset includes a power up reset, a hardware reset, and a software reset.

3. The method of claim 1, wherein the predetermined instruction set includes a first instruction of the bootstrap loader software.

4. The method of claim 1, wherein the bootstrap loader software includes a flexible installer, wherein a software image is installed according to the flexible installer instructions.

5. The method of claim 1, wherein the step of executing the predetermined instruction set comprises the steps of
    checking for a broadcast announcement of the current software version; and
    comparing the announced current software version to the resident software version.

6. The method of claim 5, wherein the step of comparing the announced current software version to the resident software version comprises the steps of:
    determining an identity of the set-top box;
    determining the current software version from the identity of the set top box and from information transmitted in the broadcast announcement; and
    comparing the resident software version to the current software version.

7. The method of claim 5, wherein:
    the broadcast announcement includes an announcement time; and
    the step of downloading the data comprising at least a portion of the current software version if the resident software version is not the current software version is performed only if the current software version is received within a time period of the broadcast announcement time.

8. The method of claim 7, further comprising the step of resetting the set top box if the current software version is not received within the time period.

9. The method of claim 5, wherein:
    the broadcast announcement includes a download time; and
    the step of downloading the data comprising the current software version if the resident software version is not the current software version is performed by performing the step of resetting the set top box prior to the download time.

10. A method of updating set top box software from a resident software version stored in a memory of a set-top box to a current software version, wherein the set-top box comprises a tuner and a modem, the method comprising the steps of:
    automatically checking to determine if the resident software version is the current software version; and
    downloading data comprising at least a portion of the current software version if the resident software version is not the current software version;
    wherein the downloaded data includes a first sub-portion comprising the at least a portion of the current software version and a second sub-portion comprising executable code for installing the at least a portion of the current software version;
    wherein the second sub-portion comprises instructions for decompressing the at least a portion of the current software version; and
    wherein the step of downloading data comprises the steps of:
        determining if the tuner receives a first signal; and
        if the tuner does not receive the first signal, automatically downloading the data comprising at least a portion of the current software version via the modem.

11. The method of claim 10, wherein the second sub-portion is stored in and executed from a random access memory of the set top box.

12. The method of claim 10, wherein the step of downloading data comprising at least a portion of the current software version if the resident software version is not the current software version is performed by the predetermined instruction set.

13. A system for updating set top box software from a resident software version stored in a memory of a set-top box to an updated software version, comprising:
    a bootstrap loader having an automatically performed instruction set for determining whether the resident software version is the current software version and for downloading data including at least a portion of the current software version if the resident software version is not the current software version, wherein the instruction set is performed upon a set top box reset; and
    a memory for storing the current software version;
    the set-top box comprising:
        a tuner for receiving a first signal having the downloaded data;
        a processor for determining if the tuner receives the first signal; and
        a modem for receiving the downloaded data if the tuner does not receive the first signal.

14. The system of claim 13, wherein the set top box reset includes a power up reset, a hardware reset, and a software reset.

15. The system of claim 13, wherein the automatically performed instruction set includes a first instruction of the bootstrap loader.

16. The system of claim 13, wherein the bootstrap loader includes a flexible installer, wherein a software image is installed according to the flexible installer instructions.

17. The system of claim 13, wherein the instruction set includes:
    one or more instructions for checking a broadcast announcement of the current software version; and one or more instructions for comparing the announced current software version to the resident software version.

18. The system of claim 17, wherein the one or more instructions for comparing the announced current software version to the resident software version comprises:
one or more instructions for determining an identity of the set-top box;
one or more instructions for determining the current software version from the identity of the set top box and from information transmitted in the broadcast announcement; and
one or more instructions for comparing the resident software version to the current software version.

19. The system of claim 17, wherein:
the broadcast announcement includes an announcement time; and
the bootstrap loader downloads the data including at least a portion of the current software version only if the current software version is received within a time period of the broadcast announcement time.

20. The system of claim 17, wherein:
the broadcast announcement includes a download time; and
the bootstrap loader downloads the data by resetting the set top box prior to the download time.

21. A system for updating set top box software from a resident software version stored in a memory of a set-top box to an updated software version, comprising:
a bootstrap loader having an automatically performed instruction set for determining whether the resident software version is the current software version and for downloading data including at least a portion of the current software version if the resident software version is not the current software version; and
a memory for storing the current software version;
wherein the downloaded data includes a first sub-portion comprising the at least a portion of the current software version and a second sub-portion comprising executable code for installing the at least a portion of the current software version;
the set-top box comprising:
a tuner for receiving a first signal having the downloaded data;
a processor for determining if the tuner receives the first signal; and
a modem for receiving the downloaded data if the tuner does not receive the first signal.

22. The system of claim 21, wherein the second sub-portion is stored in and executed from a random access memory of the set top box, and the first sub portion is stored in a flash memory of the set top box.

23. The system of claim 21, wherein the second sub-portion comprises instructions for decompressing the at least a portion of the current software version.

24. An apparatus for updating set top box software from a resident software version stored in a memory of a set-top box to a current software version, comprising:
means for automatically checking to determine if the resident software version is the current software version; and
means for downloading data comprising at least a portion of the current software version if the resident software version is not the current software version;
wherein the means for automatically checking to determine if the resident software version is the current software version comprises means for executing a predetermined instruction set of bootstrap loader software upon a set top box reset;
the set-top box comprising:
a tuner for receiving a first signal having the downloaded data;
means for determining if the tuner does not receive the first signal; and
a modem for receiving the downloaded data if the first means does not receive the first signal.

25. The apparatus of claim 24, wherein the set top box reset includes a power up reset, a hardware reset, and a software reset.

26. The apparatus of claim 24, wherein the predetermined instruction includes a first instruction of the bootstrap loader software.

27. The apparatus of claim 24, wherein the bootstrap loader includes a flexible installer, wherein a software image is installed according to the flexible installer instructions.

28. The apparatus of claim 24, wherein the means for executing the predetermined instruction set comprises:
means for checking for a broadcast announcement of the current software version; and
means for comparing the announced current software version to the resident software version.

29. The apparatus of claim 28, wherein the means for comparing the announced current software version to the resident software version comprises:
means for determining an identity of the set-top box; and
means for determining the current software version from the identity of the set top box and from information transmitted in the broadcast announcement; and
means for comparing the resident software version to the current software version.

30. The apparatus of claim 28, wherein:
the broadcast announcement includes an announcement time; and
the means for downloading the data comprising at least a portion of the current software version if the resident software version is not the current software version downloads the data only if the current software version is received within a time period of the broadcast announcement time.

31. The apparatus of claim 30, further comprising means for resetting the set top box if the current software version is not received within the time period.

32. The apparatus of claim 28, wherein:
the broadcast announcement includes a download time; and
the means for downloading the data comprising the current software version if the resident software version is not the current software version comprises means for setting the set top box prior to the download time.

33. An apparatus for updating set top box software from a resident software version stored in a memory of a set-top box to a current software version, comprising:
means for automatically checking to determine if the resident software version is the current software version; and
means for downloading data comprising at least a portion of the current software version if the resident software version is not the current software version;
wherein the downloaded data includes a first sub-portion comprising the at least a portion of the current software version and a second sub-portion comprising executable code for installing the at least a portion of the current software version;

the set-top box comprising:
  a tuner for receiving a first signal having the downloaded data;
  means for determining if the tuner does not receive the first signal; and
  a modem for receiving the downloaded data if the tuner does not receive the first signal.

34. The apparatus of claim 33, wherein the second subportion is stored in and executed from a random access memory of the set top box.

35. The apparatus of claim 33, wherein the second subportion comprises instructions for decompressing the at least a portion of the current software version.

36. The apparatus of claim 24, wherein the means for downloading data comprising at least a portion of the current software version if the resident software version is not the current software version comprises the predetermined instruction set.

37. The method of claim 1, wherein the tuner for receiving tuner receives program material and a program guide describing schedule information for the program material, and wherein the downloaded data is received as data objects in the program guide.

38. The method of claim 10, wherein the tuner receives program material and a program guide describing schedule information for the program material and wherein the downloaded data is received as data objects in the program guide.

39. The system of claim 13, wherein the tuner is configured to receive program material and a program guide describing schedule information for the program material and wherein the downloaded data is received as data objects in the program guide.

40. The system of claim 21, wherein the tuner is configured to receive program material and a program guide describing schedule information for the program material and wherein the downloaded data is received as data objects in the program guide.

41. The apparatus of claim 24, further comprising:
  a means for receiving program material and a program guide describing schedule information for the program material and wherein the downloaded data is received as data objects in the program guide.

42. The apparatus of claim 33, further comprising:
  a means for receiving program material and a program guide describing schedule information for the program material and wherein the downloaded data is received as data objects in the program guide.

* * * * *